(12) United States Patent
Tong

(10) Patent No.: US 12,451,027 B2
(45) Date of Patent: Oct. 21, 2025

(54) I-DID SYSTEM FOR STRENGTHS-WEAKNESSES BASED ASSESSMENT AND INTERVENTION FOR DYSLEXIA

(71) Applicant: The University of Hong Kong, Hong Kong (HK)

(72) Inventor: Xiuli Tong, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 407 days.

(21) Appl. No.: 18/328,803

(22) Filed: Jun. 5, 2023

(65) Prior Publication Data
US 2024/0404427 A1    Dec. 5, 2024

(51) Int. Cl.
  *G09B 19/06*   (2006.01)
  *G09B 5/02*    (2006.01)
  *G10L 15/22*   (2006.01)

(52) U.S. Cl.
  CPC ............ *G09B 19/06* (2013.01); *G09B 5/02* (2013.01); *G10L 15/22* (2013.01); *G10L 2015/226* (2013.01)

(58) Field of Classification Search
  None
  See application file for complete search history.

(56) References Cited

U.S. PATENT DOCUMENTS 9,672,618 B1   6/2017   Hassanain et al.
2014/0127667 A1  5/2014   Iannacone
(Continued)

FOREIGN PATENT DOCUMENTS

CN   112381287 A   2/2021
CN   113499525 A   10/2021
(Continued)

OTHER PUBLICATIONS

Stephen Man Kit Lee et al., Identifying Chinese children with dyslexia using machine learning with character dictation, Scientific Studies of Reading, 2023, 27, 82-100 https://doi.org/10.1080/10888438.2022.2088373.

(Continued)

*Primary Examiner* — Jason T Yen
(74) *Attorney, Agent, or Firm* — IDEA Intellectual Limited; Sam T. Yip

(57) ABSTRACT

The I-DID system is strengths-weaknesses based assessment and intervention for dyslexia, particularly for dyslexia in bilingual users. The system includes a database comprising a large-scale profile of a plurality of user performance sets across five domains: language and literacy, cognition, creativity, music, and social-emotional skills. A machine learning-based subgroup generator creates subgroups to provide individualized intervention for each of the subgroups, such that the users in the different subgroups receive different interventions. The interventions comprise training in one or more domain-general cognitive and music skills, or language-specific listening, speaking, reading, writing, or combinations thereof. The combined theory- and data-driven approach of the system integrates multiple layers of online multifaceted assessments and classifies strength-weakness profiles of bilingual users for self-managed, personalized game-based intervention. The system promotes affordability, efficiency, equality and sustainability of clinical diagnosis and treatment for bilingual users along with users growing up in a multilingual environment.

14 Claims, 29 Drawing Sheets

(56) References Cited

U.S. PATENT DOCUMENTS

| | | | |
|---|---|---|---|
| 2017/0308654 | A1* | 10/2017 | Luz Rello-Sanchez ..................... G06N 3/044 |
| 2018/0271427 | A1* | 9/2018 | Gabel .................... G16H 50/20 |
| 2019/0205372 | A1* | 7/2019 | Li ......................... G06F 40/232 |
| 2020/0381126 | A1* | 12/2020 | Breaux ................. G06F 3/0481 |
| 2021/0264202 | A1 | 8/2021 | Kalluri et al. |

FOREIGN PATENT DOCUMENTS

| | | |
|---|---|---|
| CN | 114096194 A | 2/2022 |
| CN | 114209274 A | 3/2022 |

OTHER PUBLICATIONS

Liu, H. W., & *Tong, S. X (2022). Machine learning models predict Chinese children with dyslexia and typically developed peers using multi-dimensional features, Twenty-Ninth Annual Meeting of Society of the Scientific Study of Reading. 2022, Newport Beach, CA. USA.

Shelley Xiuli Tong et al., Multiple mechanisms regulate statistical learning of orthographic regularities in school-age children: Neurophysiological evidence, Developmental Cognitive Neuroscience, 2023, 59, 101190 https://doi.org/10.1016/j.dcn.2022.10119.

Stephen Man-Kit Lee et al., Toward a model of statistical learning and reading: Evidence from a meta-analysis, Review of Educational Research, 2022, 92 https://doi.org/10.3102/00346543211073188.

Shelley (Xiuli) Tong et al., Statistical learning of orthographic regularities in Chinese children with and without Dyslexia, Child Development, 2020, 91, 1953-1969 https://doi.org/10.1111/cdev.13384.

Xiuhong Tong et al., Neurocognitive correlates of statistical learning of orthographic-semantic connections in Chinese adult learners, Neuroscience Bulletin, 2020, 36, 895-906 https://doi.org/10.1007/s12264-020-00500-y.

Xiuhong Tong et al., Visual statistical learning and orthographic awareness in Chinese children with and without developmental dyslexia, Research in Developmental Disabilities, 2019, 92, 103443 https://doi.org/10.1016/j.ridd.2019.103443.

Xiuhong Tong et al., Synergetic effects of phonological awareness, vocabulary and word reading on bilingual children's reading comprehension: A three-year study, Contemporary Educational Psychology, 2023, 73, 102153 https://doi.org/10.1016/j.cedpsych.2023.102153.

Xiuhong Tong et al., How vocabulary breadth and depth influence bilingual reading comprehension: Direct and indirect pathways, Learning and Individual Differences, 2022, 100, 102227 https://doi.org/10.1016/j.lindif.2022.102227.

Xiuhong Tong et al., Syntactic awareness matters: uncovering reading comprehension difficulties in Hong Kong Chinese-English bilingual children, Annals of Dyslexia, 2022, 72, 532-551 https://doi.org/10.1007/s11881-022-00268-y.

Xiuhong Tong et al., How Chinese-English Bilingual Fourth Graders Draw on Syntactic Awareness in Reading Comprehension: Within-and Cross-Language Effects, Reading Research Quarterly, 2021, 57, 409-429 https://doi.org/10.1002/rrq.400.

Qinli Deng et al., Suprasegmental but not segmental phonological awareness matters in understanding bilingual reading comprehension difficulties in Chinese and English: a 3-year longitudinal study. Annals of Dyslexia, 2021, 71, 150-169 https://doi.org/10.1007/s11881-021-00213-5.

Stephen Man Kit Lee et al., Spelling in developmental dyslexia in Chinese: Evidence of deficits in statistical learning and over-reliance on phonology, Cognitive Neuropsychology, 2020, 37, 494-510 https://doi.org/10.1080/02643294.2020.1765754.

Xiuli Tong et al., To see or not to see: The roles of item properties and language knowledge in Chinese missing logographeme effect, Applied Psycholinguistics, 2020, 41(5), 1113-1139 https://doi.org/10.1017/s0142716420000466.

William Choi et al., Better than native: Tone language experience enhances English lexical stress discrimination in Cantonese-English bilingual listeners, Cognition, 2019, 189, 188-192 http://doi.org/10.1016/j.cognition.2019.04.004.

Qinli Deng et al., Bidirectional cross-linguistic association of phonological skills and reading comprehension: Evidence from Hong Kong Chinese-English bilingual readers, Journal of Learning Disabilities, 2019, 52(4), 299-311 http://doi.org/10.1177/0022219419842914.

Xiuhong Tong et al., Phonological, not semantic, activation dominates Chinese character recognition: Evidence from a visual world eye-tracking study, Quarterly Journal of Experimental Psychology, 2019, 73(4), 617-628 https://doi.org/10.1177/1747021819887956.

William Choi et al., Within- and cross-language contributions of morphological awareness to word reading development in Chinese-English bilingual children, Reading and Writing, 2018, 31(8), 1787-1820 https://doi.org/10.1007/s11145-017-9770-0.

Xiuli Tong et al., Toward a graded psycholexical space mapping model: Sublexical and lexical representations in Chinese character reading development, Journal of Learning Disabilities, 2017, 51(5), 482-489 https://doi.org/10.1177/0022219417718199.

Xiuli Tong et al., Tone language experience modulates the effect of long-term musical training on musical pitch perception, The Journal of the Acoustical Society of America, 2018, 144(2), 690-697 http://dx.doi.org/10.1121/1.5049365.

Joseph Hin Yan Lam et al., Psychosocial factors, but not professional practice skills, linked to self-perceived effectiveness of telepractice in school-based speech and language therapists during COVID-19 pandemic, International Journal of Language and Communication Disorders, 2023, 58, 111-123.

Joseph Hin Yan Lam et al., Drawing a new picture: Children with developmental dyslexia exhibit superior nonverbal creativity, Research in Developmental Disabilities, 2021, 116, 104036 https://doi.org/10.1016/j.ridd.2021.104036.

Hong Kong Short-term Patent Application Search Report of the corresponding application No. 32023074089.8 mailed on Jun. 27, 2023.

* cited by examiner

An example of cognitive test game interface

An illustration of one non-verbal creativity test game interface

FIG. 18 An example of the music aptitude interface

I-DID SYSTEM FOR STRENGTHS-WEAKNESSES BASED ASSESSMENT AND INTERVENTION FOR DYSLEXIA

FIELD OF THE INVENTION

This invention pertains to an integrated dyslexic interface design (I-DID) for multifaceted assessment and intervention of Chinese, English, and Chinese-English bilingual dyslexia in 4- to 12-year-old children and their parents, utilizing parallel dual-language and strength-weakness-based approaches to classify patterns of strengths and weaknesses in five domains (language and literacy, cognition, creativity, music, and social-emotional skills) to create profile-based intervention programs and teaching aids.

BACKGROUND OF THE INVENTION

Dyslexia, a persistent difficulty in learning to read despite average intelligence, is one of the most common learning disabilities that affects 5%-10% of the population across all languages. While various tools have been developed to identify cognitive and linguistic deficits in children with dyslexia, all current reading assessment and remediation programs are deficit-based rather than strength-based. This may cause children, parents, and teachers to emphasize the deficiencies of children with dyslexia while neglecting their underutilized assets and untapped potential. Furthermore, existing tools have focused solely on: (1) one language without considering the multi-literate educational policy in multi-lingual societies; (2) children while overlooking the parent-child connection; (3) linguistic and cognitive skill deficits while neglecting underutilized assets and untapped potential such as music, social-emotional skills, and creativity; (4) costly in-person service delivery models, which limit the capacity to simultaneously assess a large number of children at risk for dyslexia; and (5) primary school-age populations and thus may miss the optimal time for prevention and intervention.

Regarding the screening and intervention tools for multilingual dyslexia, several factors need to be considered: (1) the link between children at family risk for dyslexia and their parents' biliterate and literacy skills; (2) the potential strengths and talents in non-language domains, such as creativity, music, and social-emotional skills; (3) the subject's age, such as preschool or primary school-aged children and adults; (4) online accessibility without constraints of time and location; and (5) the relative effectiveness of strengths-based interventions. Accordingly, integrating these factors into one system is critical because recognizing the underutilized assets and untapped potential of children with dyslexia can create new opportunities and promote inclusion of these children. Moreover, a system that integrates these factors can establish a timely diagnosis and provide early intervention for dyslexia.

Therefore, an urgent need exists for a more comprehensive and strengths-based approach to dyslexia screening and intervention that considers a wide range of factors, including the potential strengths and talents of individuals, their age, and their family background. By addressing this need, the I-DID invention creates new opportunities and successful inclusion for children, as well as timely diagnoses and early intervention.

SUMMARY OF THE INVENTION

One objective of the present invention is to provide a state of the art, mobile-device enabled, integrated multi-lingual dyslexia identification and intervention system and an integrated strengths-deficits based intelligent classification method to address the aforementioned shortcomings of existing diagnostic tools and unmet needs of children with dyslexia. In accordance with the first aspect of the present invention, a Chinese and English dual-language dyslexia system for strengths-weaknesses based child and adult assessment and intervention operated by an electronic teaching aid has been developed. The system comprises computer hardware, a server, and software for single or multiple users to assess their language and literacy, cognition, creativity, music, and social-emotional skills. The system is governed by an intelligent analytical engine described as follows: (1) single or multiple users are provided with a test and scoring interface comprising multifaceted assessment and intervention games via a multi-module and multimedia display; (2) user's responses are aggregated for those who complete all items for each mini-game stage, such that the system generates scores for each user with respect to five domains; (3) individual users are classified into different strengths-weaknesses subgroups once a screening model characterizes their performance scores in the five domains; (4) individual users are provided with profile-based individualized intervention for each of the subgroups, such that the users in the different subgroups receive different intervention programs via the multi-module and multimedia games. Specifically, the computerized, mobile device-enabled intervention programs are implemented with music and simulated narrative-assisted training of reading, writing, listening, speaking, or combinations thereof for the individual and multiple users.

In accordance with the first aspect of the present invention, an electronic teaching aid for strengths-weaknesses based assessment and intervention is developed. The teaching aid includes a multi-module and multimedia display, a program model, and a screening model. The display is configured to provide a scoring interface for individual and group users. The program model is configured to electrically communicate with the display and score for one or more user responses at each task stage. The program model then aggregates the scores for the users that complete all mini-games for each of the five domains (language and literacy, cognition, creativity, music, and social-emotional skills). The screening model is configured to electronically communicate with the program model and screen the users according to their scores with respect to the various domains such that the users are automatically classified into one or more subgroups. The program model is further configured to provide individualized intervention for each of the subgroups, such that the users in the different subgroups receive different intervention programs via the multi-media gamification display. The intervention programs are implemented with music- or simulated narrative-, gamification-based training in reading, writing, listening, speaking, or combinations thereof for the participants.

By the embodiments of the present invention, via utilizing a combination of theory-driven and data-driven approaches, the electronic teaching aid is able to optimally identify the subgroups that accurately reflect the similarities and differences among the neurodiverse and neurotypical users. The use of hierarchical clustering and validation through cross-validation further strengthens the reliability and validity of the subgroups. Accordingly, the participants in the corresponding subgroup can receive profile-based intervention that takes the individual's strengths and weaknesses into consideration.

In one aspect the present invention provides a system for strengths-weaknesses based clinical assessment and intervention for dyslexia. The system includes a database comprising a large-scale profile of a plurality of user performance sets across different domains. A first subgroup generator performs a theory-driven machine learning approach with respect to the database by obtaining a layer with nodes which are computed by summing all component values multiplied by factor loadings of component values using exploratory factor analysis, wherein subgroups are generated according to whether the nodes are activated. A second subgroup generator performs an integrated theory-and-data-driven machine learning approach with respect to the database by training a neural network applying a principal component analysis (PCA) via an encoder and a decoder. The automatic encoder and decoder transform the data set of each user into a three-dimensional vector, which is used to classify users via hierarchical clustering. This process groups users based on their similarities or distances from another, as calculated by the algorithm.

A data set of each user is transformed into a three-dimensional vector by the encoder, which is used to classify the users in a hierarchical clustering. This process groups users based on their similarities or distances computed among the users.

A comparator compares the theory-driven machine learning approach with the integrated theory-and-data-driven machine learning approach to determine whether the theory-driven machine learning approach aligns with the integrated theory-and-data-driven machine learning approach. A scoring module computes scores of the various domains with respect to users clustered in the different subgroups. An intervention module provides individualized intervention for each of the subgroups, such that the users in the different subgroups receive different interventions. The interventions comprise training in one or more domain-general cognitive and music skills, or language-specific listening, speaking, reading, writing, or combinations thereof.

In another aspect, the second subgroup generator clusters users in the hierarchical clustering more than once and is terminated until only two clusters exist.

In another aspect, the system includes an updating unit to dynamically update the subgroups as new users enter the database.

In another aspect, the intervention includes visual-motor games.

In another aspect, the visual-motor games direct users to perform one or more of searching for patterns, matching object pairs, or memorizing sequences.

In another aspect, the intervention includes detection and distinguishing subtlety of differences between speech and non-speech sounds.

In another aspect, the intervention includes progressively increasing levels of difficulty.

In another aspect, the intervention includes vocabulary games.

In another aspect, the vocabulary games include vocabulary breadth and depth.

In another aspect, the intervention includes music assessment games which assess music emotions and instrumental preference while incorporating basic musical elements.

In another aspect, the user performance sets include data from dyslexic bilingual users.

In another aspect, the dyslexic bilingual users are Chinese-English language dyslexic bilingual users.

The invention further provides a clinical assessment and intervention device, that includes the system for strengths-weaknesses based clinical assessment and intervention for dyslexia along with a user interface, a display, and a processor.

In another aspect, a mobile device selected from one or more of a mobile phone, a tablet, or a laptop may include the clinical assessment and intervention device.

BRIEF DESCRIPTION OF THE DRAWINGS

Embodiments of the invention are described in more details hereinafter with reference to the drawings, in which:

FIGS. 3A-3C, FIGS. 4A-4E, FIGS. 5A-5C, FIGS. 6A-6E, FIGS. 7A-7E, FIGS. 8A-8D, FIG. 9, FIGS. 10A-10C, FIG. 11, FIGS. 12A-12B, and FIGS. 13A-13B illustrate an exemplary scoring interface with questions for assessment in accordance with one aspect of the present invention;

DETAILED DESCRIPTION

In the following description, apparatuses, systems, and/or methods for teaching aids via strengths-weaknesses based assessment and intervention and the like are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1A:
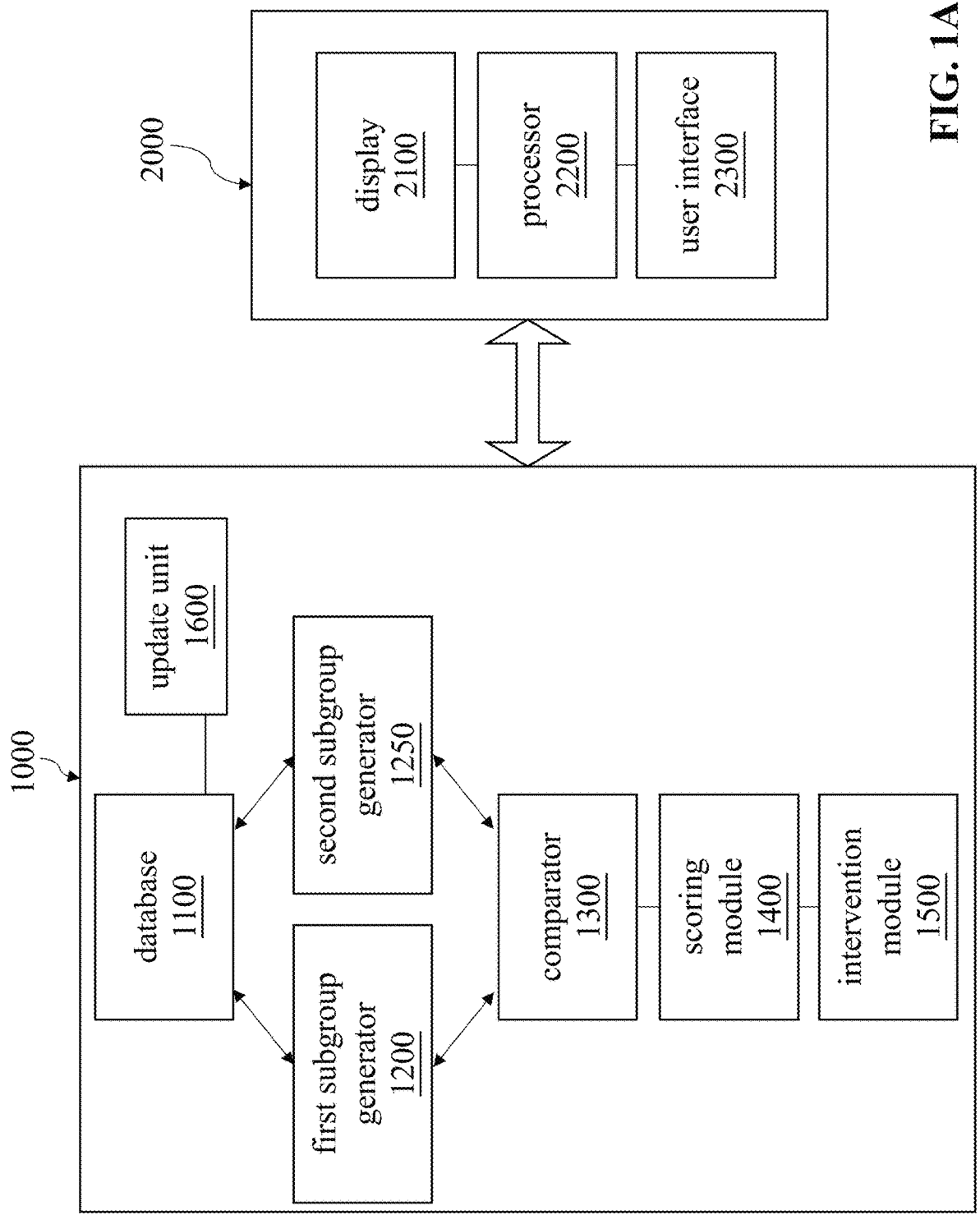
FIG. 1A depicts a schematic diagram of a system for strengths-weaknesses based assessment and intervention in accordance with an embodiment of the present invention.

FIG. 1A depicts a system 1000 for strengths-weaknesses based clinical assessment and intervention for dyslexia. FIG. 1A is a system overview with further details of the various system components described in further detail below. System 1000 may be implemented in hardware, software, or a combination of hardware and software.

The system 1000 contains a dynamically updated database 1100 including a large-scale profile of a plurality of user performance sets across different domains. A first subgroup generator 1200 performs a theory-driven machine learning approach with respect to the database 1100 by obtaining a layer with nodes which are computed by summing all component values multiplied by factor loadings of component values using exploratory factor analysis (described in detail below). Subgroups are generated according to whether the nodes are activated. A second subgroup generator 1250 performs an integrated theory-and-data-driven machine learning approach with respect to the database 1100 by training a neural network applying a principal component analysis (PCA) via an encoder and a decoder. A data set of each user is encoded to a three-dimensional vector by the encoder and clusters the users in a hierarchical clustering to group users based on the users' similarity or distance computed among the users. In one embodiment, the second subgroup generator may cluster users in the hierarchical clustering more than once and is terminated until only two clusters exist.

A comparator 1300 compares the theory-driven machine learning approach with the integrated theory-and-data-driven machine learning approach to determine whether the theory-driven machine learning approach aligns with the integrated theory-and-data-driven machine learning approach. In this manner, the system is self-validating to ensure accuracy. A scoring module 1400 determines scores of the various domains with respect to users clustered in the different subgroups.

An intervention module 1500 provides individualized intervention for each of the subgroups, such that the users in the different subgroups receive different interventions. The interventions comprise training in one or more domain-general cognitive and music skills, or language-specific listening, speaking, reading, writing, or combinations thereof. Various interventions may be selected. Including visual-motor games which may direct users to perform one or more of searching for patterns, matching object pairs, or memorizing sequences. Alternatively, the intervention may include detection and distinguishing subtlety of differences between speech and non-speech sounds. Vocabulary games directed to both vocabulary breadth and depth (e.g., understanding and use of vocabulary) may also be provided. Music assessment games may be selected that assess music emotions and instrumental preference while incorporating basic musical elements. As the users successfully complete various intervention tasks, progressively increasing levels of difficulty may be provided.

To dynamically update the data base, an updating unit 1600 updates the subgroups as new users enter the database 1100. The updating unit 1600 may receiver user information via wired or wireless connections to a network such as an internal network or via the Internet.

Typically, the user performance sets include data from dyslexic bilingual users who present unique challenges when assessing and intervening for dyslexia. In one aspect, these bilingual users may be Chinese-English language dyslexic bilingual users. Since Chinese is a character-based, logogram writing system which uses unique characters for individual words, while English uses an alphabet-based system with sounds associated with letters and groups of letters, the assessments and interventions are more demanding.

A clinical assessment and intervention device 2000 includes the system for strengths-weaknesses based clinical assessment and intervention 1000 along with a user interface 2300, a display 2100, and a processor 2200.

In another aspect, a mobile device selected from one or more of a mobile phone, a tablet, or a laptop may include the clinical assessment and intervention device.

Figure 1B:
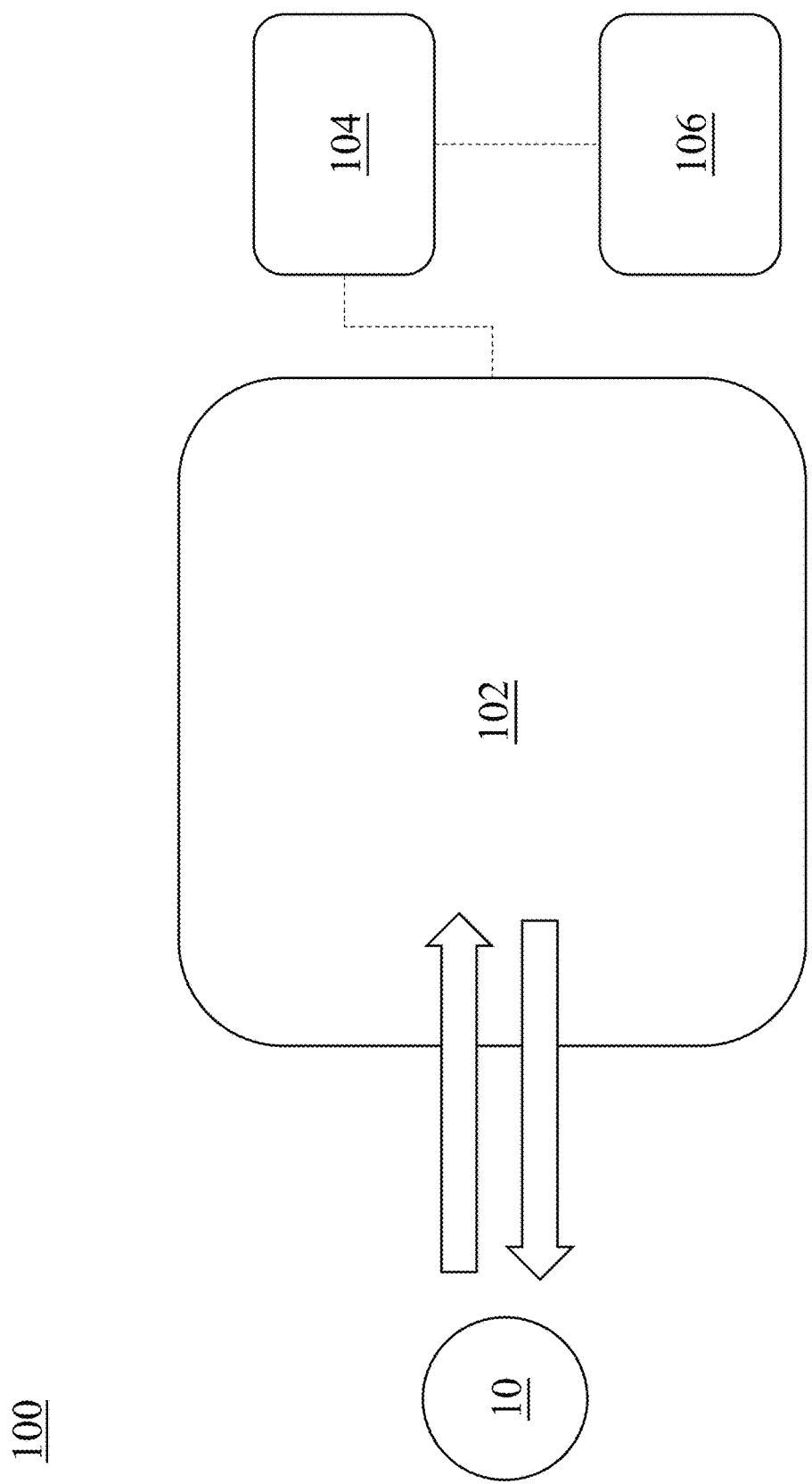
FIG. 1B depicts a schematic diagram of an electronic teaching device for strengths-weaknesses based assessment and intervention in accordance with one aspect of the present invention that may implement the system of FIG. 1A.

FIG. 1B depicts a schematic diagram of an implementation of device 2000 for strengths-weaknesses based assessment and intervention in accordance with one aspect of the present invention. Device 100 is an electronic teaching device 100 and includes a display 102, a program module 104 for implementing interventions 1500, and a screening module 106 for implementing diagnostic testing for dyslexia The program module 104 is configured to electronically communicate with the display 102 and the screening module 106 and will send diagnostic assessments to the update module 1600 for updating database 1100. Teaching device may interactively communicate with system 1000 via a network such as the Internet.

Figure 2:
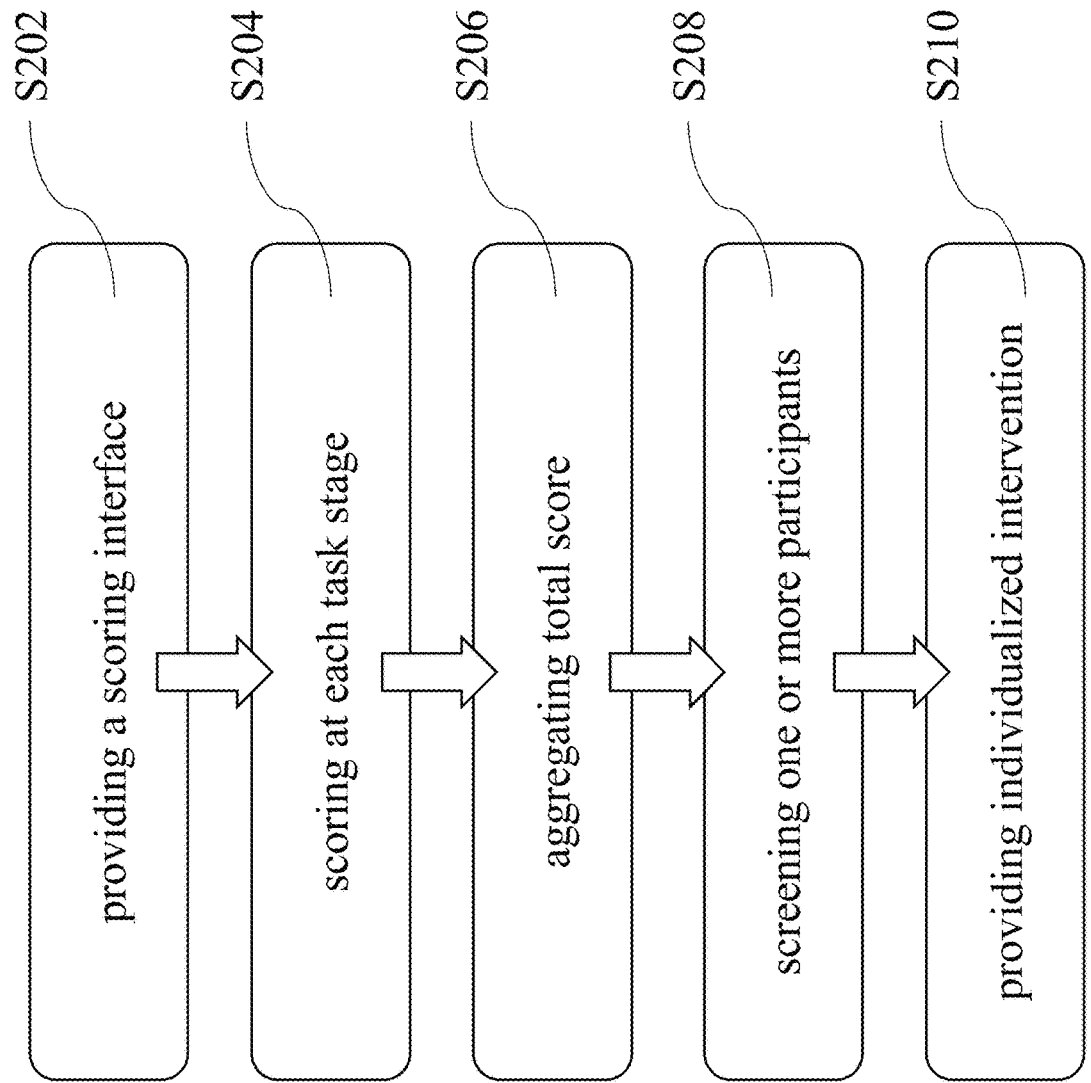
FIG. 2 depicts a schematic diagram of a method for strengths-weaknesses based assessment and intervention in accordance with one aspect of the present invention that may be performed by the system of FIG. 1A.

FIG. 2 depicts a schematic diagram of a method 200 for strengths-weaknesses based assessment and intervention in accordance with one aspect of the present invention that may be implemented by system 1000 in connection with device 2000 and/or device 100. Single and multiple users can simultaneously gain access to the electronic teaching system 1000 with the method 200 running. The electronic system 1000 in combination with the method 200 can be referred to as an integrated dyslexic interface design (I-DID) system. The method 200 includes steps S202, S204, S206, S208, and S210.

In step S202, a scoring interface for one or more participants 10 via the display 102 or display 2100 is provided and for communication with scoring module 1400. The scoring interface utilizes different assessment formats associated with the task features. The summary of the types of interfaces can be found in TABLE 1. In one embodiment, the I-DID system is applicable to preschool children and adults. The child module covers five different assessment domains capturing Chinese and English language and literacy, cognition, creativity, music, and social-emotional skills; while the adult module covers Chinese and English language and literacy as well as music assessments. Then, in step S204, the scoring module 1400 scores for one or more responses of the participants 10 at each task stage.

TABLE 1

Summary of the Types of Interfaces of the Child and Adult Screening Tests

| Interface Type | | | | Language | | |
|---|---|---|---|---|---|---|
| Response Category | Output Format | Additional Features | FIG. | L1 = Chinese L2 = English | Child Tests | Adult Tests |
| Audio-recording (User Initiated) | MPEG (MP3), Float (time) | a. Number display | 3A | L1, L2 | Rapid Digit Naming | Rapid Digit Naming |
| | | b. Text display (Letter/Word) | 3B | L1, L2 | Word Reading | Word Reading |

TABLE 1-continued

Summary of the Types of Interfaces of the Child and Adult Screening Tests

| Interface Type | | | | Language | | |
|---|---|---|---|---|---|---|
| Response Category | Output Format | Additional Features | FIG. | L1 = Chinese L2 = English | Child Tests | Adult Tests |
| | | | | L2 | Letter Identification | — |
| | | | | L2 | Nonword Reading | Nonword Reading |
| | | c. Text display (Passage) | 3C | L1 | — | Passage Reading |
| Audio-recording (Initiated automatically) | MPEG (MP3), Float (time) | a. Image display | 4A | L1 | Nonword Reading | Nonword Reading |
| | | b. Audio playing (One part) | 4B | L1 | Digit Span | Digit Span |
| | | c. Audio playing (Two parts) | 4C, 4D | L1, L2 L1, L2 | Phonology Phonology | Phonology Phonology |
| | | d. Image display, text display audio playing | 4E | L2 | — | Morphology |
| Multiple-choice (Image) | String data, Float (time) | a. No additional features | 5A | L1, L2 | Print Knowledge | — |
| | | b. Audio playing (3 pictures with 2 choices/ 4 pictures with 3 choices) | 5B, 5C | L1, L2 L1, L2 | Orthography Phonology | — — |
| | | c. Audio playing (2/4/6 choices ) | 6A, 6B, 6C, 6D | L2 L1 | Prosody Prosody | — — |
| | | | | L1 L1, L2 L2 L1 | Morphology Vocabulary — Music Perception | — — Vocabulary Music Perception |
| | | d. Text display | 6E | L2 | — | Sentence Comprehension |
| Multiple-choice | String data, Float (time) | a. Text display (Word/ Sentence) | 7A | L1 | — | Vocabulary |
| | | b. Text display (Passage) | 7B, 7C | L2 L1, L2 | — — | Morphology Vocabulary |
| | | | | L1, L2 L1 | — — | Reading Comprehension Passage Reading |
| | | c. Audio playing (Tick and Cross) | 7D, 7E | L1 | Prosody | — |
| | | | | L1 | Music Aptitude (I) | — |
| | | d. Audio playing (2/3 choices) | 8A, 8B | L1, L2 | Oral Language Comprehension | — |

TABLE 1-continued

Summary of the Types of Interfaces of the Child and Adult Screening Tests

| Interface Type | | | | Language | | |
|---|---|---|---|---|---|---|
| Response Category | Output Format | Additional Features | FIG. | L1 = Chinese L2 = English | Child Tests | Adult Tests |
| | | | | L1, L2 | — | Phonology |
| | | | | L1 | Music Aptitude (II) | — |
| | | e. Text display and audio playing | 8C | L2 | — | Morphology |
| | | f. Image display and audio playing | 8D | L2 | Morphology | — |
| Matching | String data, Float (time) | a. Text display | 9 | L1, L2 | — | Vocabulary |
| Handwriting (in box) | PNG, Float (time) | a. Audio playing | 10A, 10B, 10C | L1 | — | Chinese Dictation |
| Handwriting (in line) | PNG, Float (time) | a. Audio playing | 11 | L2 | — | English Spelling |
| Audio-recording and Multiple-choice | String data, Float (time) | a. Audio playing (Tick and Cross) | 12A, 12B | L1, L2 | Competing Language Processing Task | Competing Language Processing Task |
| Drawing and Audio-recording | WebM (MP4), MPEG (MP3), PNG, Float (time) | a. Audio-playing and Time limit | 13A, 13B | — | Drawing Tasks | — |

Figure 3C:
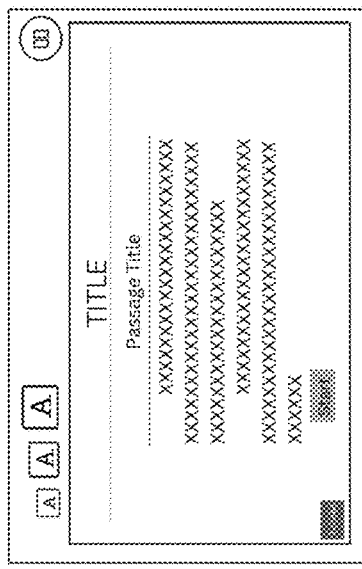
Figure 3B:
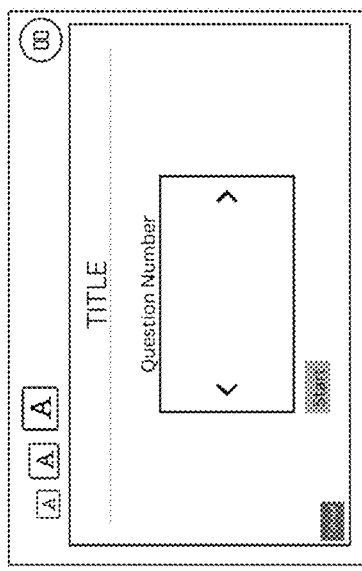
Figure 3A:
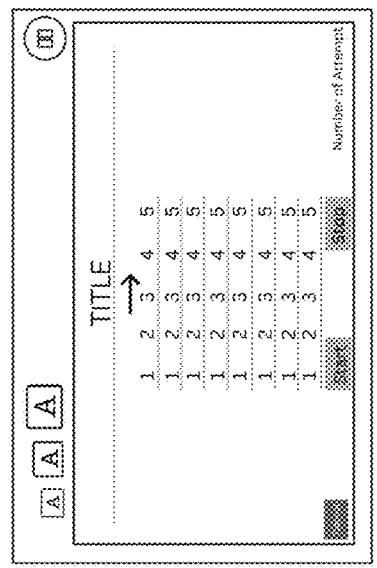

FIGS. 3A-3B illustrate the user-initiated audio-recording testing formats. FIG. 3A shows the interface of a cognitive assessment called rapid digit naming. There are two trials in the assessment. Responses in both trials are recorded, and users will automatically be directed to the second trial after completing the first trial. FIG. 3B shows an example of the reading assessment format, in which stimuli are displayed on the screen one at a time. While responses are recorded throughout the test, users are allowed to click the right and left arrows to either proceed to the next stimulus or return to the previous stimulus. FIG. 3C shows the testing interface of a passage reading task.

Figure 4A:
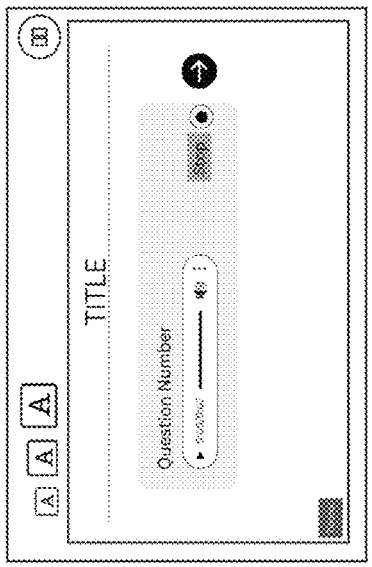
Figure 4B:
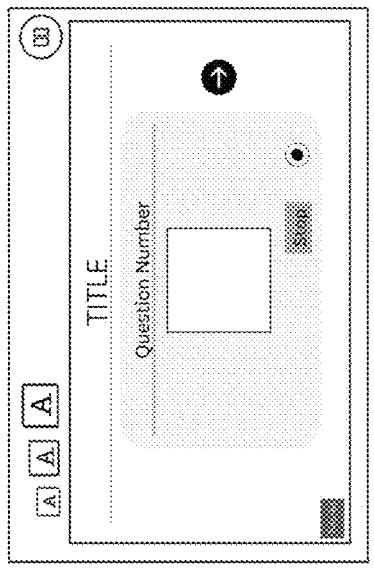
Figure 4E:
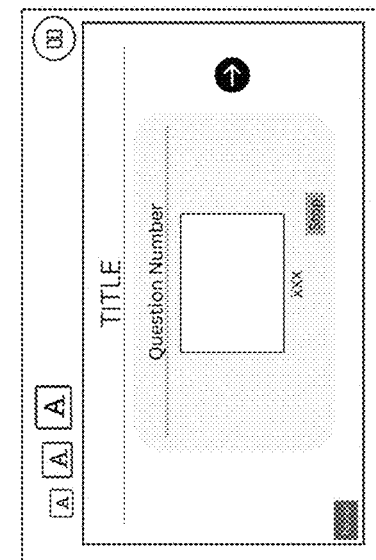
Figure 4D:
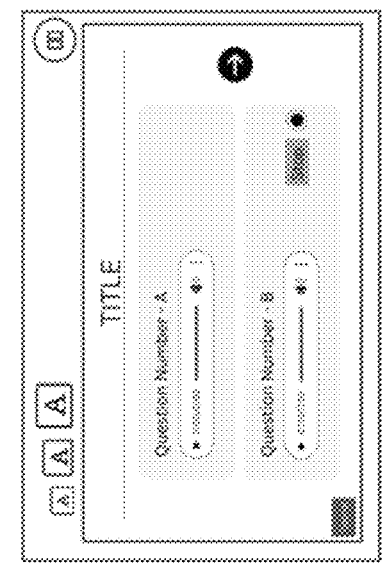
Figure 4C:
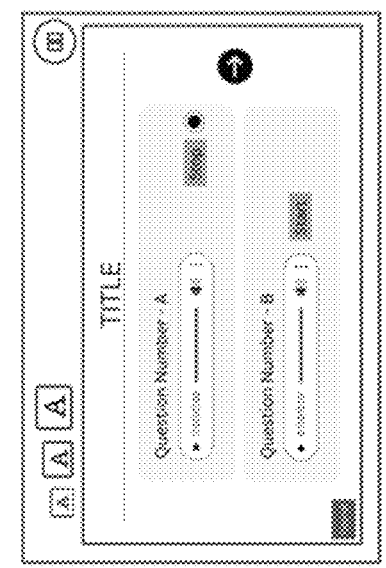

FIGS. 4A-4E illustrate the automatically-initiated audio-recording testing formats. FIG. 4A shows another reading assessment format that involves an image display. Users are asked to pronounce each character or pseudo-character and stop the automatically-initiated recording after each response. FIG. 4B shows an example of the testing format that involves audio playing. This format is applied to the digit span test and a phonological test that assesses users' word blending ability. Users' responses are automatically recorded after a stimulus is presented in each trial. FIGS. 4C-4D illustrate a two-part audio-playing and recording testing format that is applied to another type of phonological test that assesses users' ability to remove a sound from a target word that is auditorily presented. FIG. 4C shows the audio-recording process initiated after the first audio is played. FIG. 4D shows the audio-recording process initiated after the second audio is played. FIG. 4E shows the interface of a morphological assessment that involves audio recordings, visual images, and printed texts. Verbal responses are recorded automatically after the audio is played in each trial.

Figure 5A:
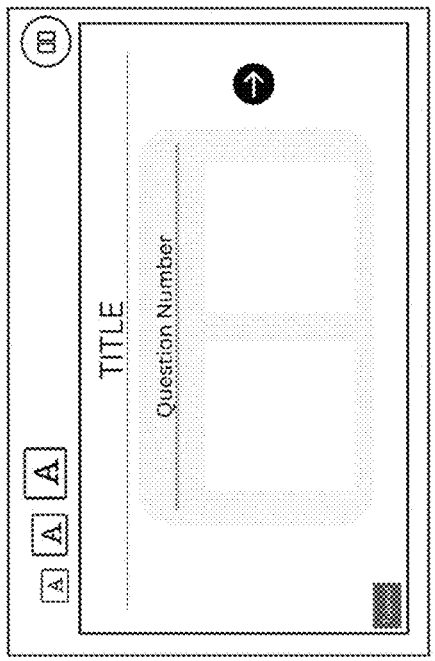
Figure 5C:
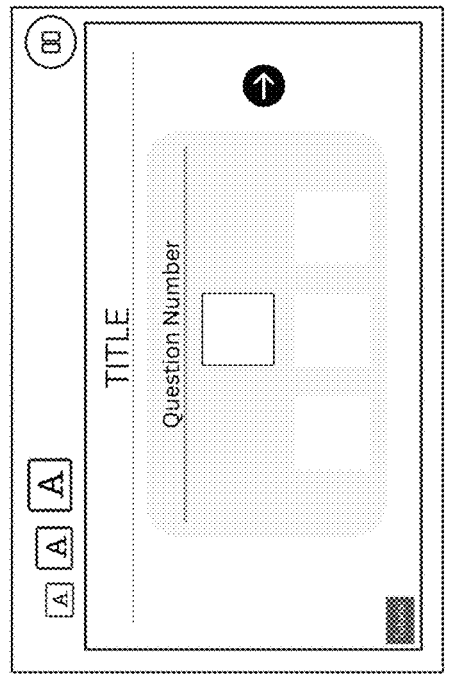
Figure 5B:
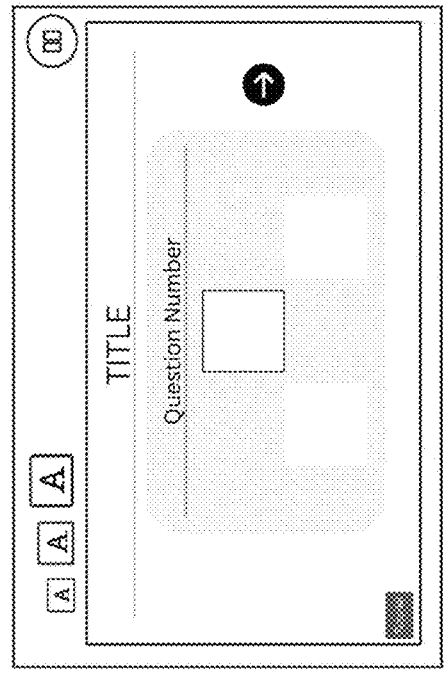

FIGS. 5A-5C illustrate the multiple-choice testing formats that use images as key responses. FIG. 5A shows an example of the assessments where items are displayed as images in the print knowledge and orthographic assessments. FIGS. 5B-5C illustrate the testing format that involves paired image and audio display in an emergent phonological test that assesses users' ability to detect the option (displayed in the second row) that sounds similar to the target word (displayed in the first row). The image representing each word is highlighted when the corresponding audio is played to reduce the demand on users' memory. FIG. 5B shows the two-alternative forced-choice test format. FIG. 5C shows the three-alternative forced-choice test format.

Figure 6A:
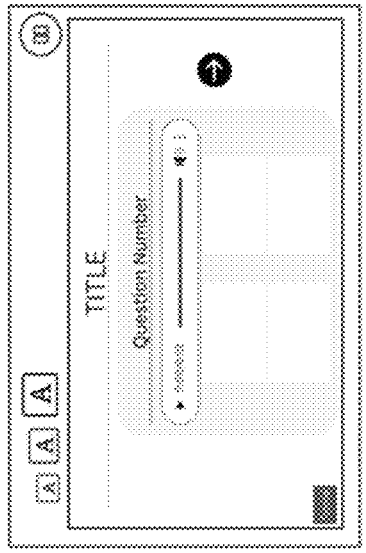
Figure 6B:
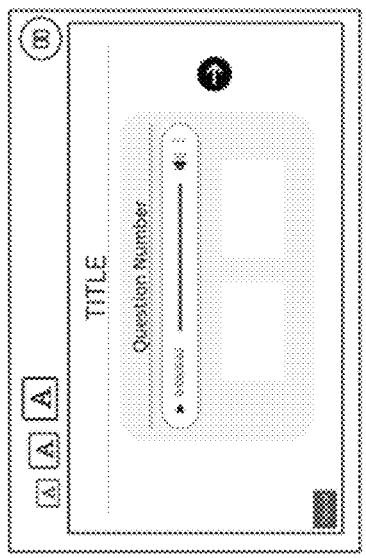
Figure 6C:
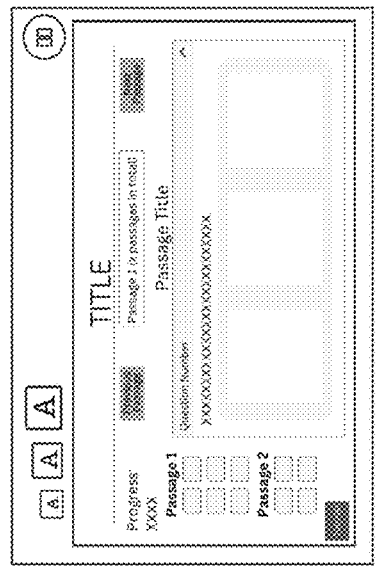
Figure 6D:
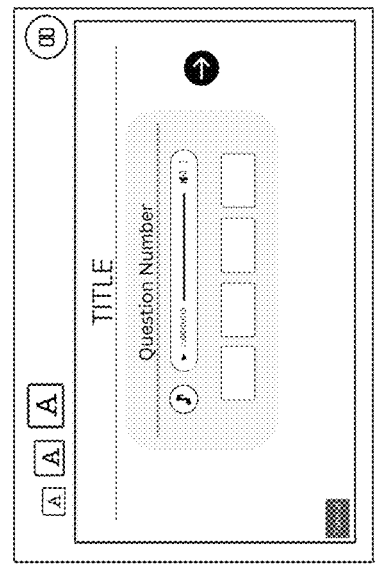
Figure 6E:
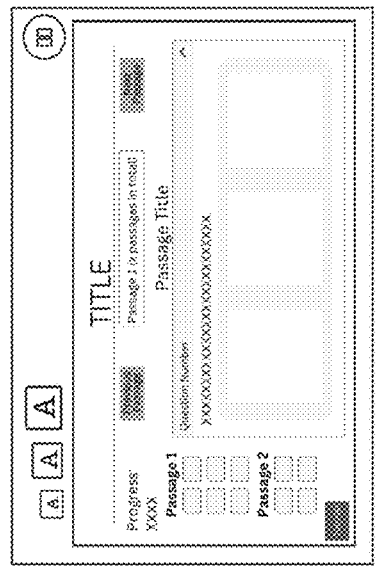

FIGS. 6A-6E illustrate the multiple-choice testing formats that involve two, four and six options. FIG. 6A shows the two-option prosodic discrimination test format that asks users to select the best option based on the audio stimulus. FIG. 6B shows the four-option multiple-choice format in an emergent morphological assessment and an emergent vocabulary assessment. FIG. 6C shows the six-option task format that allows users to identify the picture that best represents the audio stimulus. FIG. 6D shows the format of the music perception test that asks users to select one of four emotions based on the music. FIG. 6E illustrates the testing format of sentence comprehension assessment that asks users to select the image that best represents the paragraph in each trial. A progress column is available for users to monitor their own completion of the test.

Figures 7A, 7B, 7C, 7D, 7E:
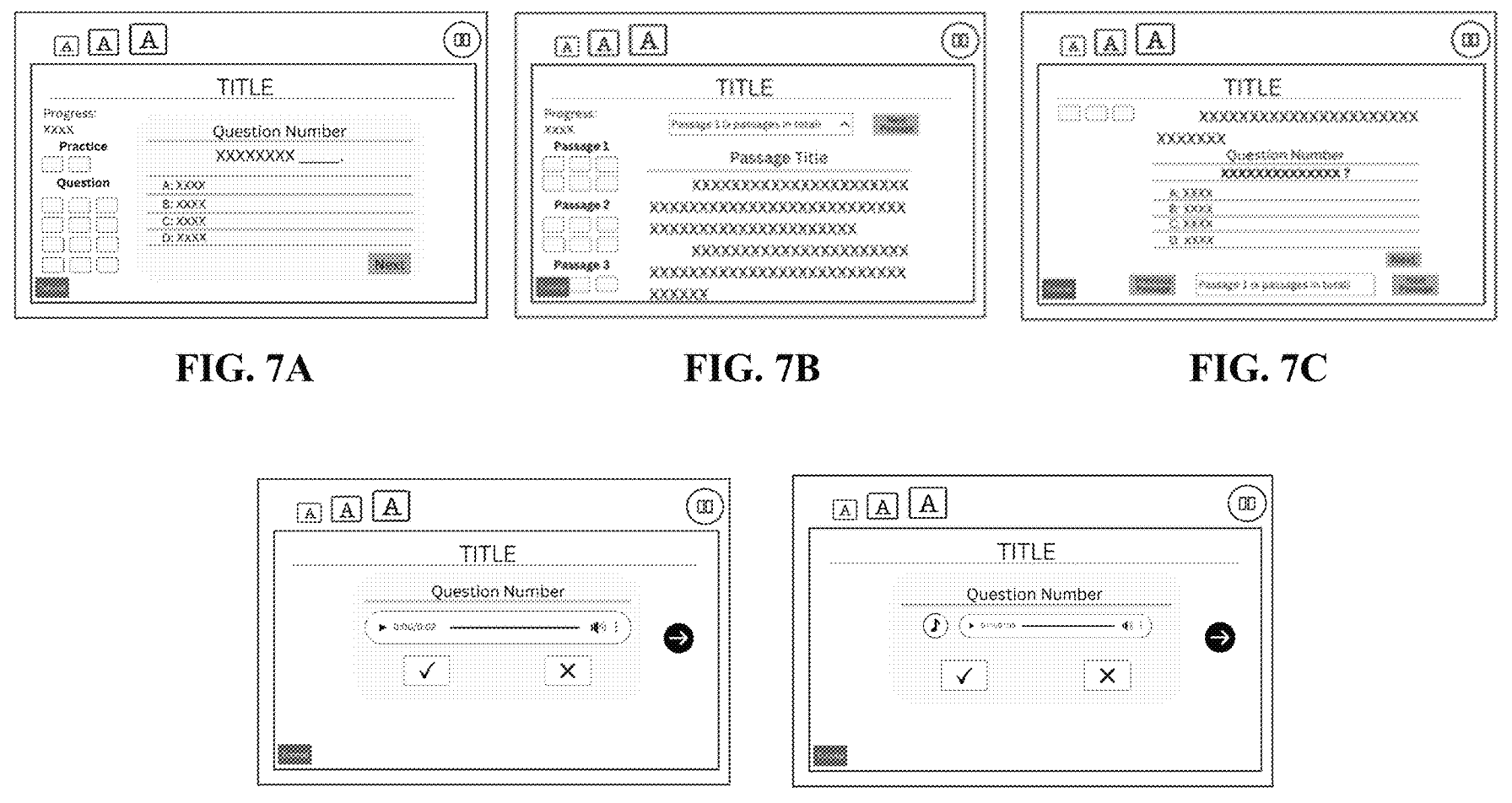
Figure 8A:
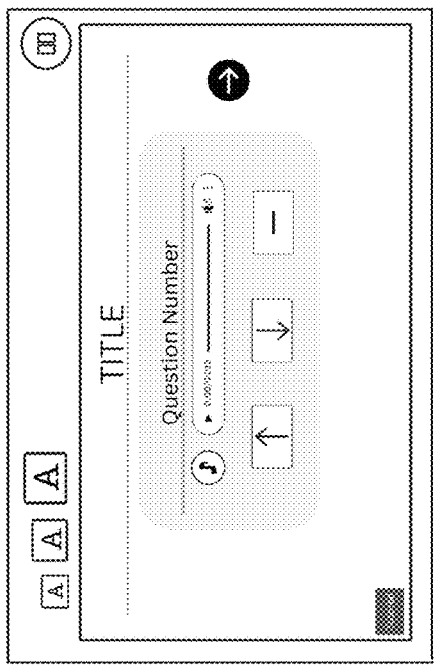
Figure 8B:
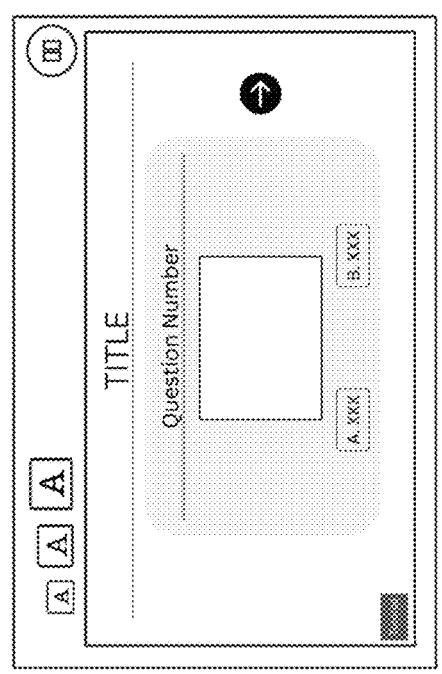
Figure 8C:
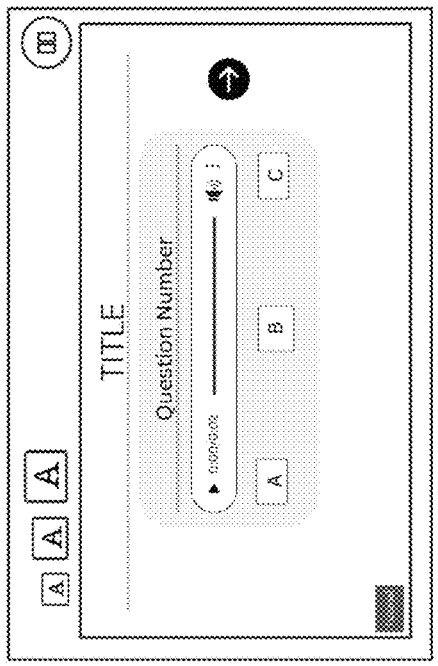
Figure 8D:
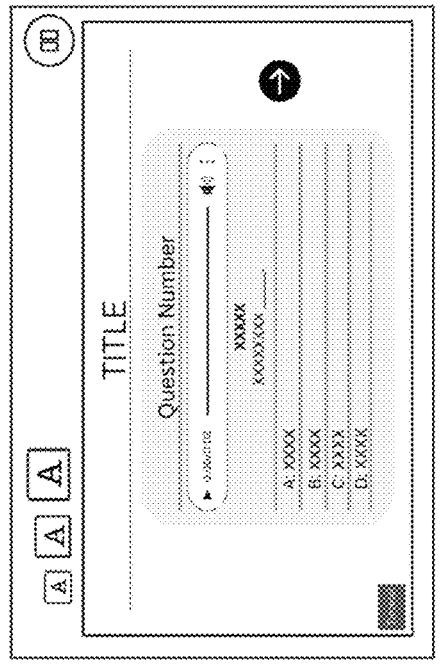

FIGS. 7A-7E illustrate the multiple-choice testing formats that use text display as key responses. FIG. 7A shows a testing format for one type of adult vocabulary and morphological assessment that displays questions in text, prompting users to complete the questions using one of four response options displayed underneath. FIGS. 7B-7C illustrate the testing formats for vocabulary, reading comprehension, and passage reading assessments that display passages followed by multiple-choice responses. FIG. 7B shows an example of passage display within the assessment task. FIG. 7C shows the question section at the end of the passage, asking users to select a response from four options. FIGS. 7D-7E illustrate the testing format that asks users to select "tick" or "cross" in response to audio stimuli. FIG. 7D displays a format adopted in a prosodic assessment, where two stimuli are played and users are asked to select "tick" or "cross" based on whether they perceived the stimuli as sounding the same or different. FIG. 7E displays another binary choice format, asking users to judge whether the musical excerpts sound the same or different. FIGS. 8A-8D display the testing formats presented as audio stimuli that require responses from two or three options. FIG. 8A displays the testing format used in the oral language comprehension and one type of adult phonological assessment, whereby a sentence is played and users are asked to select a response from three choices s. FIG. 8B shows a similar format of the musical aptitude assessment. FIG. 8C displays the format used in adult morphological assessments where stimuli in text and audio are simultaneously displayed and users are asked to select a response from four multiple-choice options. FIG. 8D illustrates an image and audio display format of another emergent morphological assessment where an image is shown with audio stimuli playing simultaneously and users are asked to select a response from two forced-choice options.

Figure 9:
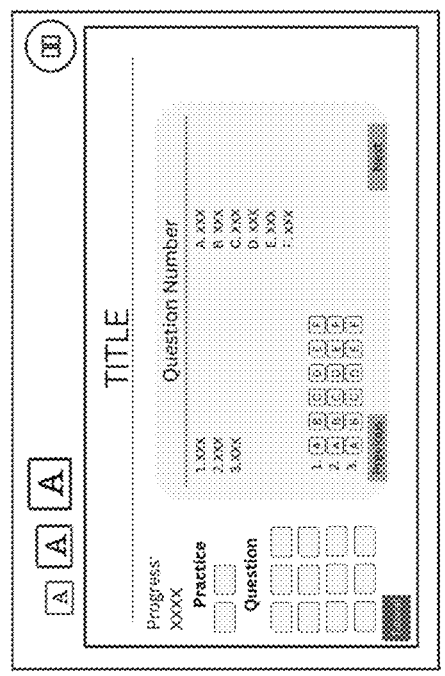

FIG. 9 illustrates the matching format of assessment for adult vocabulary tests, in which users match target words with descriptors.

Figure 10C:
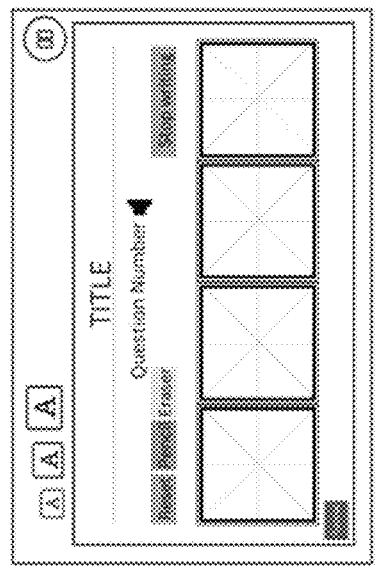
Figure 10B:
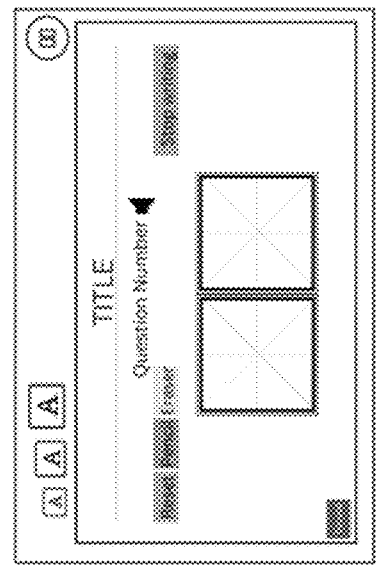
Figure 10A:
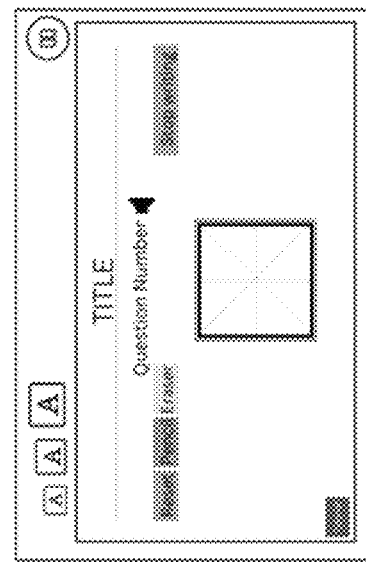
Figure 11:
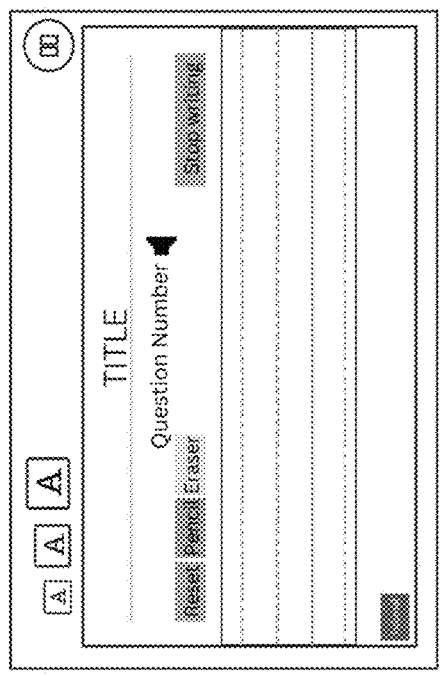

FIGS. 10A-10C illustrate the handwriting testing formats in Chinese dictation assessment where users are asked to write characters in box(es) on the screen while listening to an audio recording of Chinese words in each trial. FIGS. 10A, 10B and 10C are the test interfaces for one-, two-, and four-character items, respectively. FIG. 11 illustrates a handwriting testing format of English spelling assessment which asks users to write English words above lines on the screen while listening to an audio recording of English words in each trial. Users are allowed to amend or rewrite their responses using the eraser and reset functions on the screen.

Figure 12A:
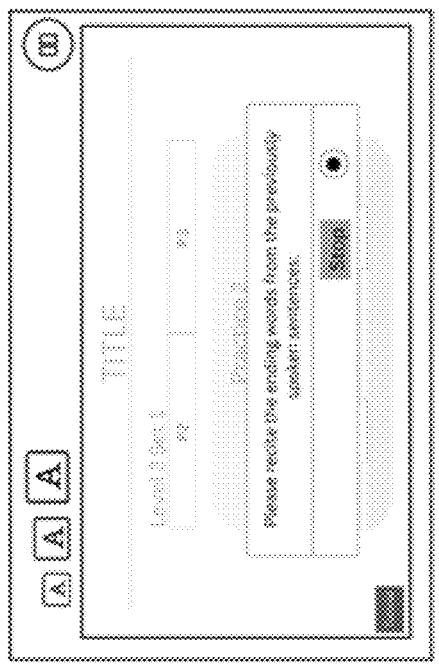
Figure 12B:
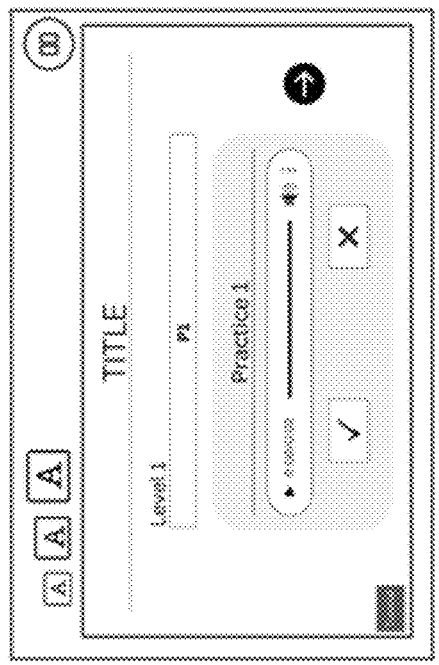

FIGS. 12A-12B illustrate a multi-level testing format for a working memory assessment called competing language processing test. First, as presented in FIG. 12A, users are asked to determine whether the sentences played in each trial are correct or not by pressing the corresponding keys. Users are then asked to repeat the last word of each sentence. As presented in FIG. 12B, the audio-recording function is initiated automatically to record the users' verbal responses.

Figures 13A, 13B:
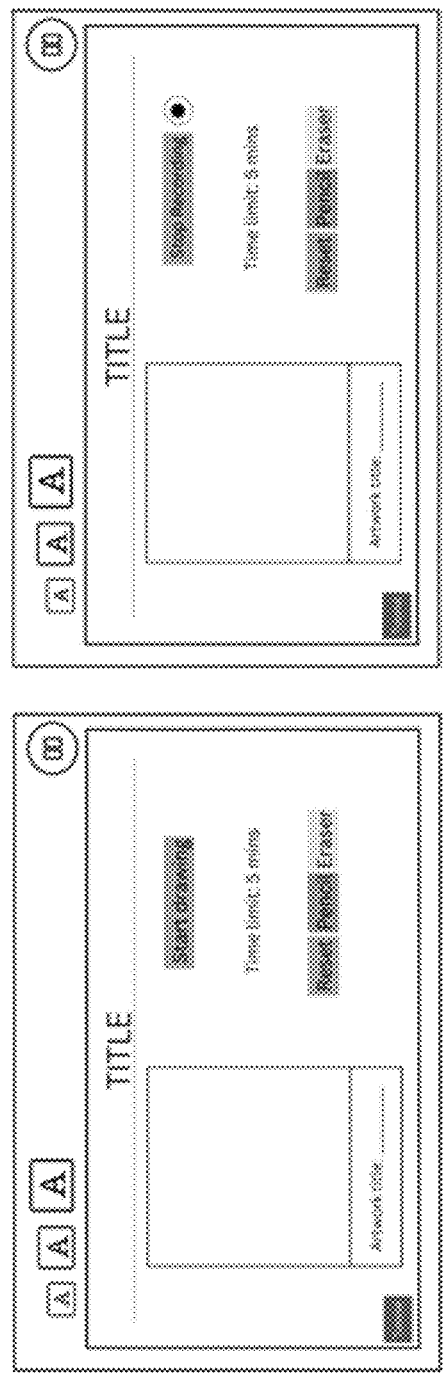
Figure 14:
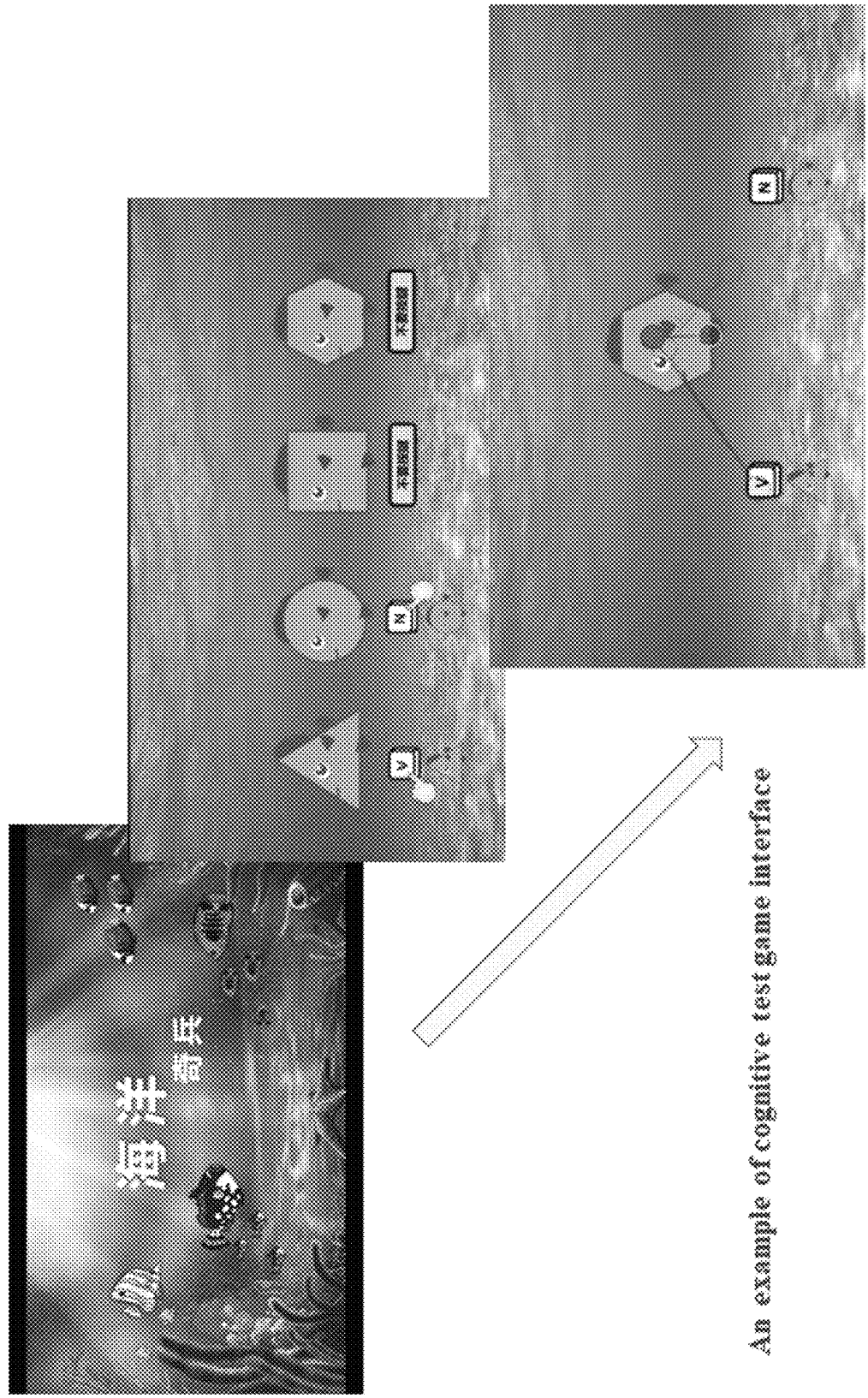
FIGS. 14-18 show the exemplary interfaces of I-DID assessment in accordance with one aspect of the present invention.
Figure 15:
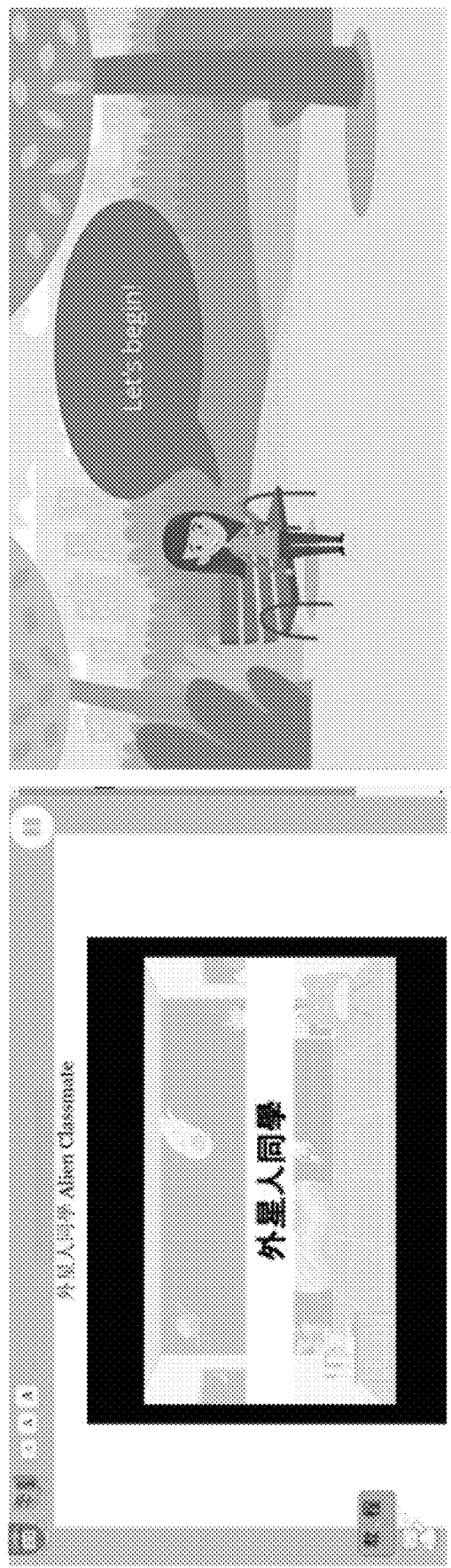
Figure 16:
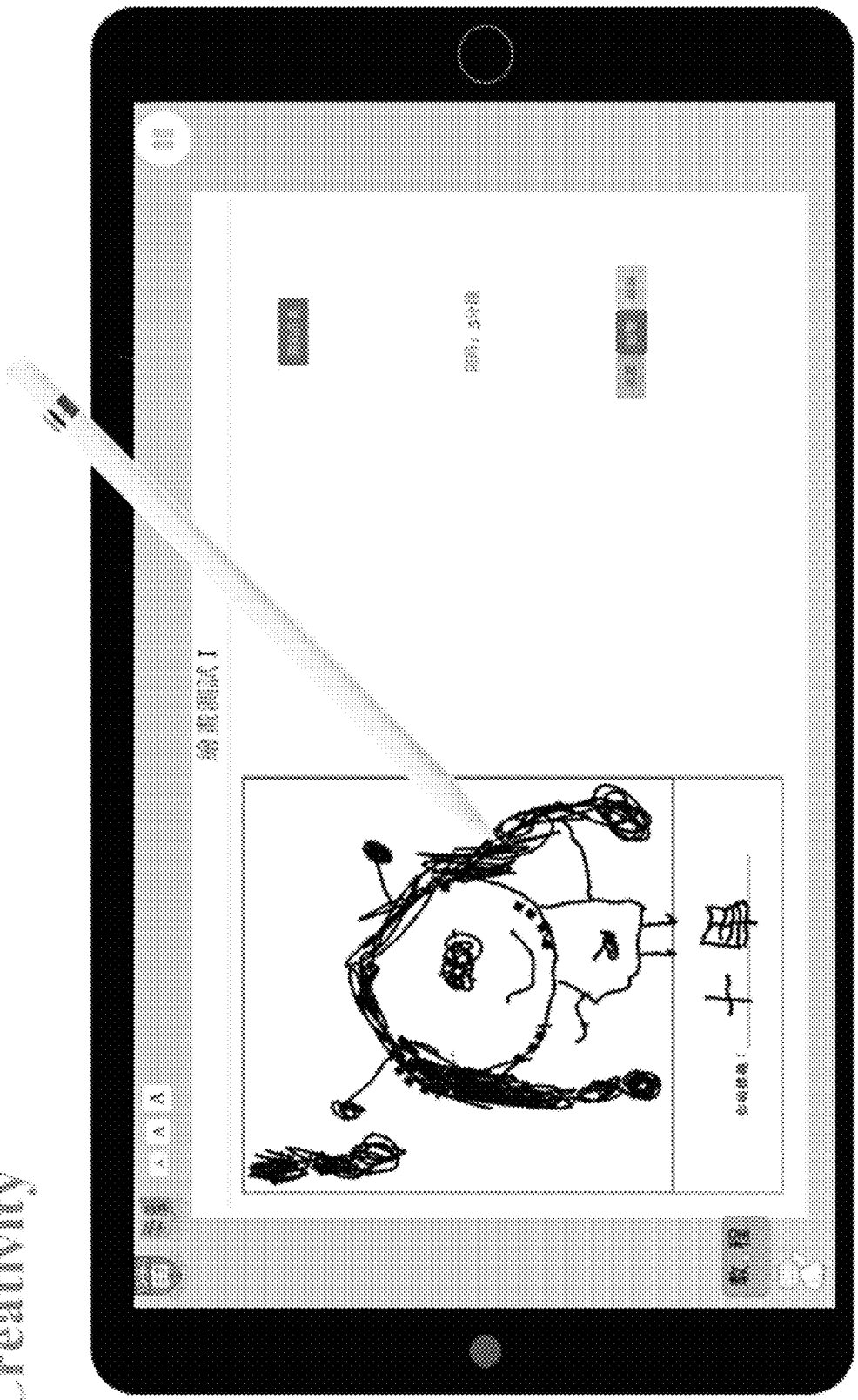
Figure 17:
Figure 18:
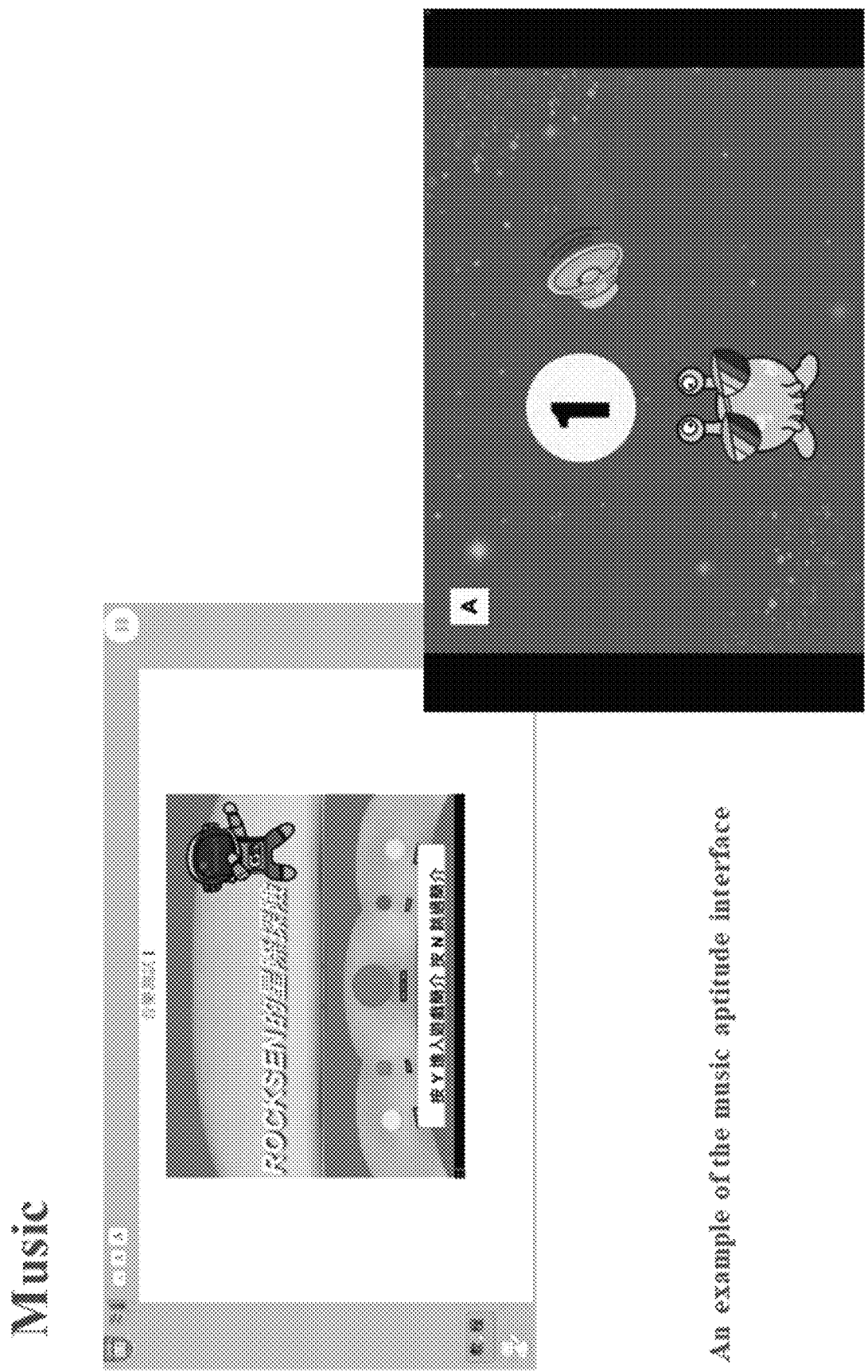

FIGS. 13A-13B illustrate an example of the drawing test formats. FIG. 13A shows the test interface, which includes timer, eraser and reset functions. Users are allowed to create their own drawings in the frame provided on the screen. FIG. 13B shows the test interface when the time limit is up. Users are asked to verbally provide a name for the drawing.

FIGS. 14-18 illustrate examples of the I-DID assessment interfaces in accordance with various embodiments of the present invention. Advanced graphic designs, animation and multimedia displays are utilized to create a stimulating web and app testing environment for users.

Figure 19:
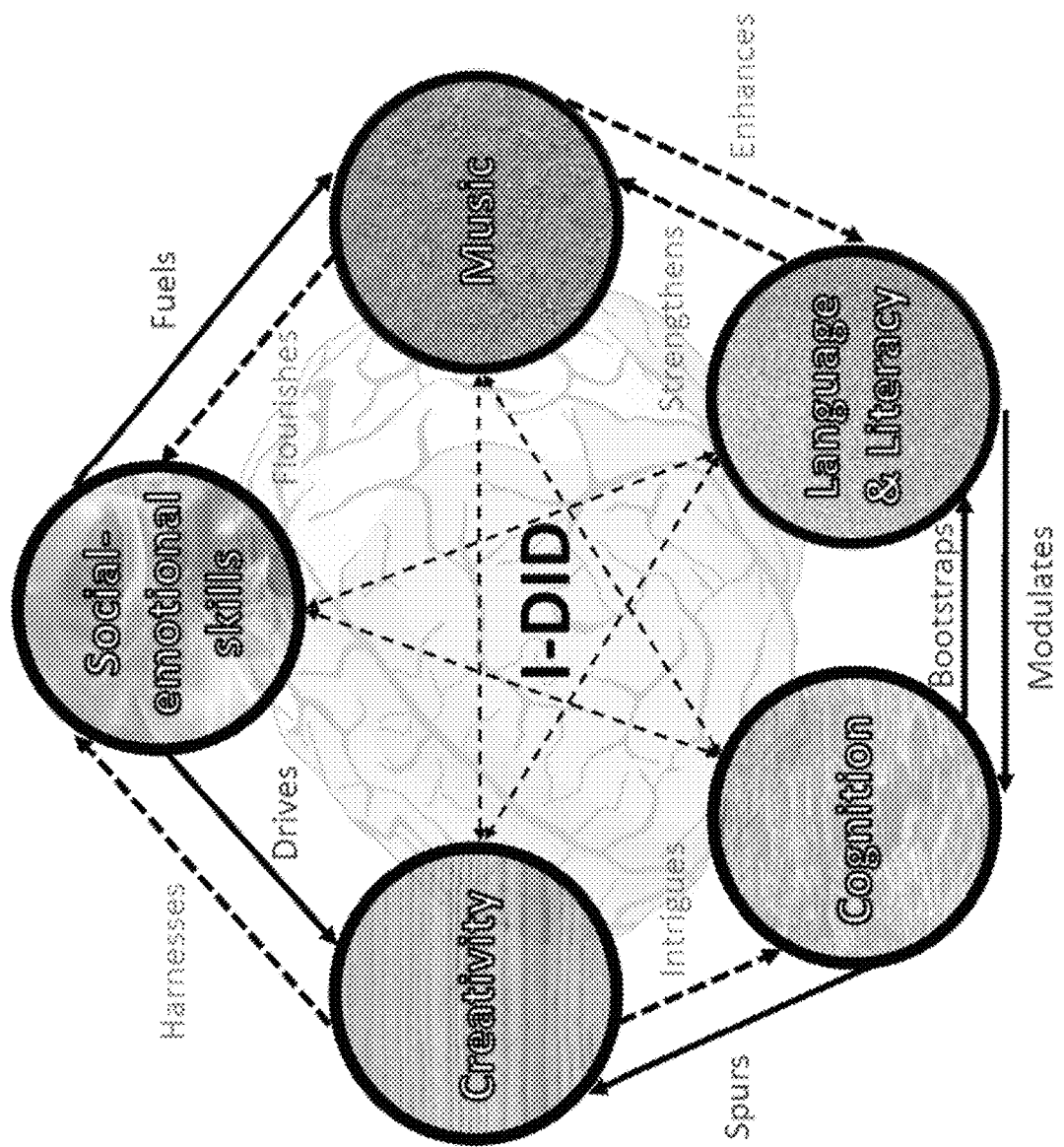
FIG. 19 illustrates an exemplary relationship among various domains in accordance with one aspect of the present invention.

After the assessment, the scoring module 2400 in step S206 aggregates the total score for the users 10 that have completed all items for each task stage, such that each of the users 10 is assigned scores with respect to various domains. In this regard, FIG. 19 illustrates an exemplary relationship among various domains in accordance with one aspect of the present invention. The I-DID system synchronizes and optimizes five essential human elements. The relationship of the illustration in FIG. 19 is the 2C-SEM-2L brain-based learning and training model, which contains five domains: language and literacy, cognition, creativity, music, and social-emotional skills.

Unlike existing diagnostic assessment and intervention tools rooted in theories that focus on the linguistic and cognitive deficits of dyslexia, the I-DID system aligns with the brain-based 2C-SEM-2L model, which emphasizes the totality of individual development as determined by the connection, interaction, and coordination of five essential human elements, i.e., language and literacy, cognition, creativity, music, and social-emotional skills, as shown in FIG. 19. The mechanisms underpinning the connection and coordination of these five elements can be determined so as to serve as guiding principles for the I-DID system's content design. The details of the design of the assessments for each domain are described below.

1. Cognition

The I-DID system assesses three key cognitive skills that play fundamental roles in children's language and literacy development across cultures: memory, executive function, and statistical learning. Children with dyslexia exhibit prominent weaknesses in working memory (WM) or the ability to temporarily memorize and subsequently use the information to complete tasks. Behavioral evidence suggests that children with dyslexia are more likely to have deficits in WM, in both verbal and nonverbal modalities (Zou et al., 2022). These behavioral findings are supported from a neural perspective, with the brain regions associated with WM being less activated among children with dyslexia (Beneventi et al., 2010). Three types of online WM games have been designed by using visual blocks, digits, and words to assess children's visual-spatial, phonological, and verbal WM, respectively.

Another key cognitive skill is executive function (EF). Three core cognitive processes of EF are inhibition, updating, and shifting that relate to goal-directed behaviors. Researchers have shown that children with dyslexia demonstrate less proficient inhibition and updating, but their ability to shift has been underscored as a potential relative strength (Doyle et al., 2018). However, the relative strength in response accuracy lessened after accounting for response speed. Thus, by modifying existing EF paradigms, the I-DID interface utilizes two distinct but related games to identify specific EF weaknesses and strengths.

In addition, a program of research on statistical learning (SL), i.e., the human brain's ability to automatically extract relational patterns from environmental input, has demonstrated that children with dyslexia exhibit at least mild impairment in SL across different research paradigms and age (for a review, see Lee, Tong, and Cui, 2022). For example, using paradigms involving the learning of artificial logographic characters resembling real Chinese characters, researchers have shown that Hong Kong school-age children with dyslexia exhibit sub-optimal learning of left-right structured characters, compared with top-bottom characters, and have difficulty matching sounds to characters during learning, indicating potential weaknesses in the learning of novel characters that may be inconsistent with usual structures (Tong et al., 2020). However, relative strengths have also been found for those with dyslexia, e.g., children with dyslexia have not shown impairments in the SL of positional regularities, and increased exposure mitigates SL difficulties (He & Tong, 2017). From a strength-based perspective, these findings indicate that, when the amount of exposure is increased, children with dyslexia exhibit comparable specific types of statistical learning performance with typically developing peers. Thus, based on integrating the cumulative evidence on SL in Chinese children with dyslexia, two games assessing children's SL of linguistic and non-linguistic regularities across contexts have been designed.

2. Language and Literacy

Unlike language and literacy measures in existing dyslexic assessment or screening, which focus solely on single measures of metalinguistic awareness, sight word reading and dictation, I-DID employs a multi-level and multi-componential approach to systematically assess key oral language and metalinguistic skills that are closely related to word reading and word dictation/spelling.

Specifically, oral language skills comprise two key components, namely, vocabulary and narrative skills, with the former focusing on children's understanding of word meanings while the latter evaluates how children produce stories within a context. The self-developed vocabulary game design comprises breadth (number of words) and depth (the level of understanding) in both receptive (i.e., understanding meanings of words) and expressive (production of words) modalities. Narrative skills are assessed using a story retelling format by asking children to orally construct a coherent story based on a presented picture. These designs are based on recent work on Hong Kong Chinese-English bilingual children's vocabulary skills and development (Tong & Tong, 2022).

In addition to the aforementioned key oral language skills, the in-house self-developed language games of the present invention also include metalinguistic skills such as phonological and morphological awareness. The design of the phonological awareness assessment of the present invention differs from existing standardized tests and tools in three key aspects. First, the format of existing assessment of metalinguistic awareness is similar to quizzes and exams in school that assess children's rote memorization skills. However, the I-DID system's phonological and morphological awareness assessment games draw upon children's tacit understanding and fluid reasoning of various levels of linguistic structures. Second, the delivery model is different. Unlike existing screening and assessment tests administered using the traditional paper-pencil format, the metalinguistic awareness assessment of the present invention is embedded in an online game environment. This not only stimulates children's interests in language learning; it also reduces children's test anxiety and pressure. Third, the items in the metalinguistic awareness tasks are designed according to a systematic analysis of distributional information, including frequency, complexity and imageability in the self-developed Chinese and English corpora for Hong Kong Cantonese-English bilingual preschool and school-age children. Moreover, the parallel Chinese and English metalinguistic awareness task designs have considered the mixed and nonlinear exposure of Cantonese and English among Hong Kong bilingual children.

3. Creativity

Creativity is characterized as a multi-component construct composed of the processes involved in generating novel ideas through divergent thinking, and exploring and evaluating the workability of those ideas through convergent thinking (Barbot et al., 2015). Growing evidence suggests creativity as, broadly, a strength among children with dyslexia, but this depends on the modality of the assessment task. For example, a recent study of 124 Hong Kong Chinese children with dyslexia in Grades 2-5 and 122 age-matched typically developing (TD) peers demonstrated that, regardless of grade, Chinese children with dyslexia exhibited higher nonverbal creativity than, and comparable figural creativity to, their TD peers; and that creativity was not significantly correlated with reading and writing (Lam & Tong, 2021). Other studies have also reported that even high school students with dyslexia have been shown to demonstrate stronger abilities in connecting unusual ideas and identifying novel relationships between concepts in verbal domains, compared to their TD peers (Cancer et al., 2016).

Given the possible diverse creativity profiles of children with dyslexia, the I-DID system comprehensively assesses creativity through in-house self-developed games. More importantly, unlike traditional paper-pencil measures of creativity, creativity games of the present invention are carried out through an online interface, including the functionality of recording children's creative processes automatically. Through the creativity assessment of the present invention, the I-DID system aims to diverge from emphasizing only "deficits" of children with dyslexia, and instead consider and incorporate the creative strengths exhibited by these children from the perspectives of teachers, parents, and clinical and educational practitioners. Subsequently, the I-DID system develops effective strength-based learning strategies to help children with dyslexia succeed and thrive in school and in society.

4. Music

The music assessment games of the present invention are based on existing evidence showing that children with dyslexia differ significantly from TD children in various aspects of musical capacities. In terms of rhythm and meter, children with dyslexia, relative to TD children, exhibited difficulties in musical stress (Caccia & Lorusso, 2020), melody discrimination (Forgeard et al., 2008) and musical timing (Overy et al., 2003). Moreover, longitudinal evidence suggests that musical abilities, such as rhythm perception and production, are significantly associated with reading-related skills, especially phonological awareness, among children with dyslexia (Reifinger, 2019).

Unlike previous music assessments, such as the Primary Measures of Music Audiation (PMMA), Intermediate Measures of Music Audiation (IMMA; Gordon, 1979; 1986), and Montreal Battery of Evaluation of Musical Abilities (MBEMA; Peretz et al., 2013), which assess solely elemental musical domains, the I-DID music assessment games of the present invention measure for the first time other critical factors, specifically music emotions and instrumental preference, while incorporating basic musical elements (i.e., pitch, rhythm, and tempo). The rationale for evaluating the perception of music emotion is based on evidence showing that music links closely with emotion and expression. An individual's ability to sense emotional information in music, comprehend different performance features and identify various musical timbres is essential in interpreting music holistically. As such, these distinctive features make the I-DID assessment games more novel and comprehensive than previous assessment tools. In designing the music games, extra consideration was taken to accommodate the needs of children with dyslexia. Specifically, all music assessment materials are gamified using both visual and auditory display, thus requiring no extra reading and verbal demands. Additionally, the user-friendly online modality means that assessment administration requires children to press only the keys on a computer keyboard. Thus, I-DID games represent the first and most comprehensive and unique online music assessment with a dyslexia-friendly design.

5. Social-Emotional Skills

Unlike most existing diagnostic assessment tools, which have completely neglected the social-emotional resilience of individuals with dyslexia, the I-DID system has systematically evaluated the social-emotional skills of children with dyslexia and their parents/caregivers. Specifically, the I-DID system's online games are equipped with 14 parent- and child-reported questionnaires and tests that assess children's social-emotional well-being on both the micro- and macro-levels by considering individual personality traits, social relations, and educational contexts. More importantly, this is the first online system to assess children's social-emotional skills and parental well-being in a Hong Kong context.

The design of the present invention's assessment games, as well as questionnaires and tests, to target social-emotional skills is motivated by Vygotsky's (1978) social learning theory, which emphasizes the connection between emotions and language by framing language as a proactive and advanced tool facilitating emotion regulation. This view aligns well with growing evidence showing that an individual's social-emotional skills, or the ability to perceive, express and regulate emotions, play a critical role in language and literacy acquisition. Despite the link between social-emotional and language and literacy skills, no diagnostic and screening tools have considered the social-emotional outcomes of children with dyslexia. In the I-DID assessment programs of the present invention, two potential perspectives have been synergized to conceptualize these outcomes for children with dyslexia. On one hand, children with dyslexia have generally been found to experience the primary consequences of difficulties at school, feelings of being different, and perceived stigma, which may contribute to secondary consequences, such as lower self-esteem in their own academic abilities and poor emotional wellbeing (Livingston et al., 2018; Terras et al., 2009). On the other hand, a resilience-based approach would suggest that some children with dyslexia, particularly those who develop better coping skills, show fewer negative consequences compared to those who do not develop such skills (Catts & Petscher, 2022). As such, social-emotional wellbeing can be understood as a potential protective factor against the academic challenges faced by children with dyslexia (Terras et al., 2009), a role evidenced in resilience-related intervention programs that foster comparable levels of coping abilities among secondary school students with and without dyslexia (Firth et al., 2013). By reconciling these aspects, the I-DID system's assessment of social-emotional skills not only evaluates all possible negative and positive social-emotional outcomes of dyslexia, but also considers the complex interplay between potential negative social-emotional consequences induced by being dyslexic and the development of strong positive coping skills, i.e. resiliency.

Referring back to FIGS. 1A, 1B and 2, after aggregating the total score for the users 10 in one embodiment, the total score for the users 10 is depicted via the display 102 or display 2100. A radar chart is depicted via the display 102 or display 2100 to show users' performance across the five domains. Thereafter, in step S208, the screening model 106 screens the users 10 according to their scores with respect to the five domains, such that the users 10 are assigned to one or more subgroups. The subgroups are related to three key functional domains: (1) cognition and creativity (C-domain); (2) language and music (L-domain); and (3) social and emotional skills (S-domain). The C-domain refers to the set of high-order executive processes for abstract reasoning, decision making, and problem solving. The L-domain refers to the set of domain-specific knowledge to decode and encode linguistic and non-linguistic information with rule-governed prosodic structures. The S-domain targets a set of social-emotional skills for external interaction and internal regulation by integrating thoughts, knowledge, and feelings.

In each of the CLS domains, users are classified into high (+) and low (−) groups. As such, in one embodiment, there are eight subgroups in response to the C-domain, the L-domain, and the S-domain: (1) C+L+S+; (2) C+L+S−; (3) C+L−S+; (4) C+L−S−; (5) C−L+S+; (6) C−L+S−; (7) C−L−S+; and (8) C−L−S−. For example, the subgroup "C+L+S+" means the C-, L-, and S-domains are all at high level; and the subgroup "C+L+S−" means the C- and L-domains are at high level, while the S-domain is at low level.

Figure 20:
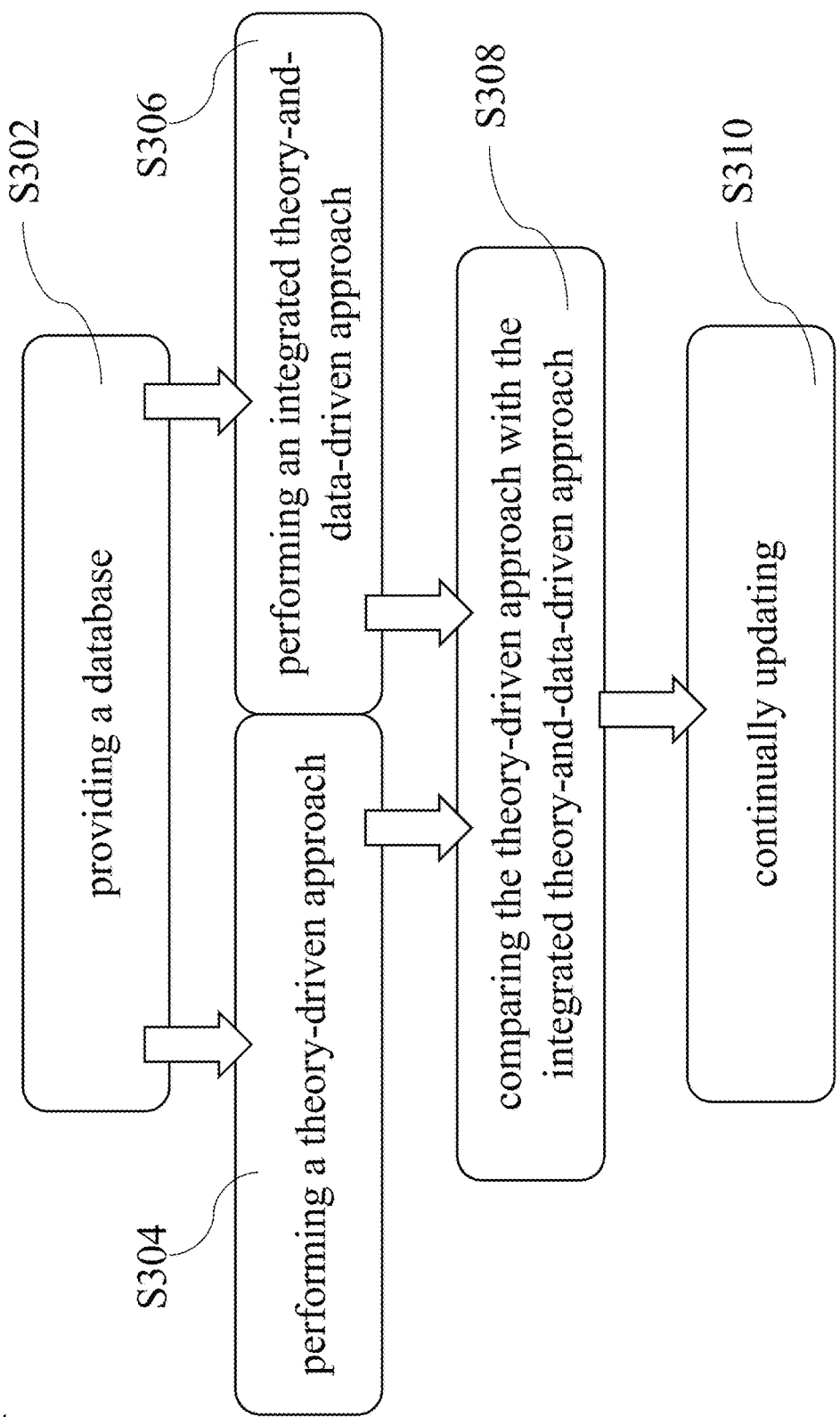
FIG. 20 depicts a schematic diagram of a machine learning method for the generation of the subgroups in accordance with one aspect of the present invention.

In one embodiment, the screening model 106 is further configured to generate and preserve a plurality of the subgroups. The generation of the subgroups is described as follows. FIG. 20 depicts a schematic diagram of a machine learning method 300 to generate the subgroups in accordance with one aspect of the present invention. The machine learning method 300 includes steps S302, S304, S306, S308, and S310.

In step S302, a database, including a large-scale profile of a plurality of user performance sets across different domains, is provided. The database can be fed as training data into the screening module 106 for training purposes. The database provides a crucial starting point for the generation of subgroups based on the identified performance patterns. The data stored in the database informs the development of a robust and accurate screening module that can be utilized to support intervention efforts.

Figure 21:
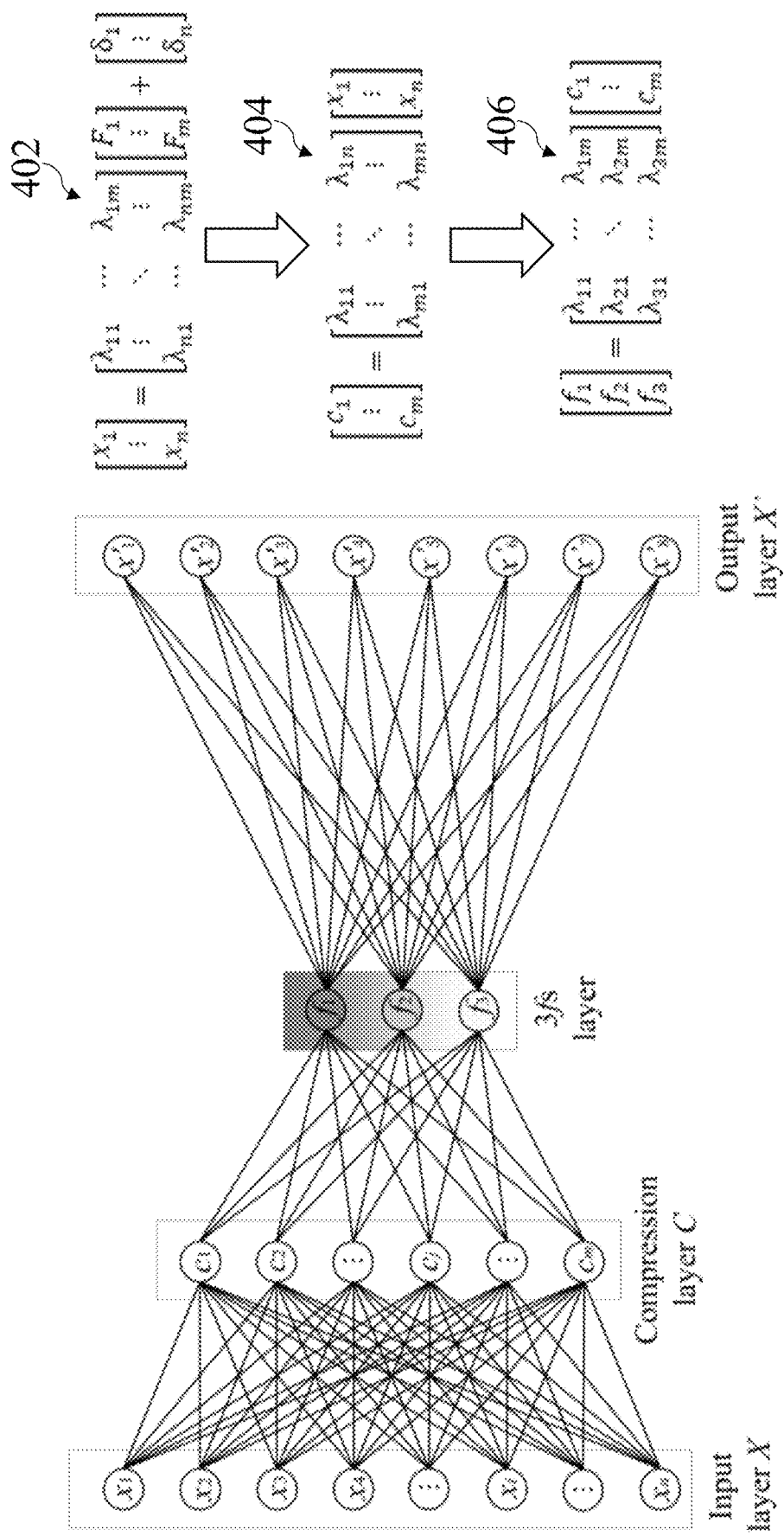
FIG. 21 depicts a schematic diagram illustrating a theory-driven approach in accordance with one embodiment of the present invention.

In step S304, a theory-driven approach is performed. FIG. 21 illustrates the theory-driven approach in accordance with one embodiment of the present invention. The theory-driven approach is performed with respect to the database, which aims to obtain a $3f_s$ layer in the illustration of FIG. 21. The C-, L-, S-domains are interrelated and interdependent in a foundational-formal-functional $3f_s$ layer, in which: the node $f_1$ represents "C" which is the fundamental top-down process underlying the L-domain; the node $f_2$ represents "L" which is the formal structure expressing the C-domain and underlying the S-domain; and the $f_3$ represents "S" which are the functional skills expressing the L-domain.

The input layer includes a set of normalized feature value x with a set size of n. To reduce the data dimension based on a theory-driven technique, the first step is to conduct an exploratory factor analysis (EFA) to compute the covariance among observed variables explained by a set of latent factors F with a set size of m. Input $x_i$ is loaded onto $F_j$ with a factor loading $\lambda_{ij}$ plus an error term $\delta_i$: $x_i = \lambda_{ij} * F_j + \delta_i$. Thus, the n inputs and m factors can be represented by the matrix notation 402.

Based on the EFA results, a component value $c_j$ for $F_j$ is computed by summing all the inputs that are multiplied by the corresponding factor loadings as represented by the matrix notation 404. Next, another set of EFA is performed to obtain the factor loadings of the component values on three second-order latent factors that correspond to $F_1$, $f_2$, and $f_3$. Similarly, the $F_1$, $f_2$, and $f_3$ values are computed by summing all the component values that are multiplied by their factor loadings on the second-order latent factors as represented by the matrix notation 406.

Each of the nodes in the $3f_s$ layer (i.e., $f_1$, $f_2$, and $f_3$) is activated when its value is greater than the cut-off, such as 25th percentile of the scaled score in some embodiments. The 2×2×2 activation pattern of these three nodes produces or generates eight subgroups in the output layer as mentioned above.

Figure 22:
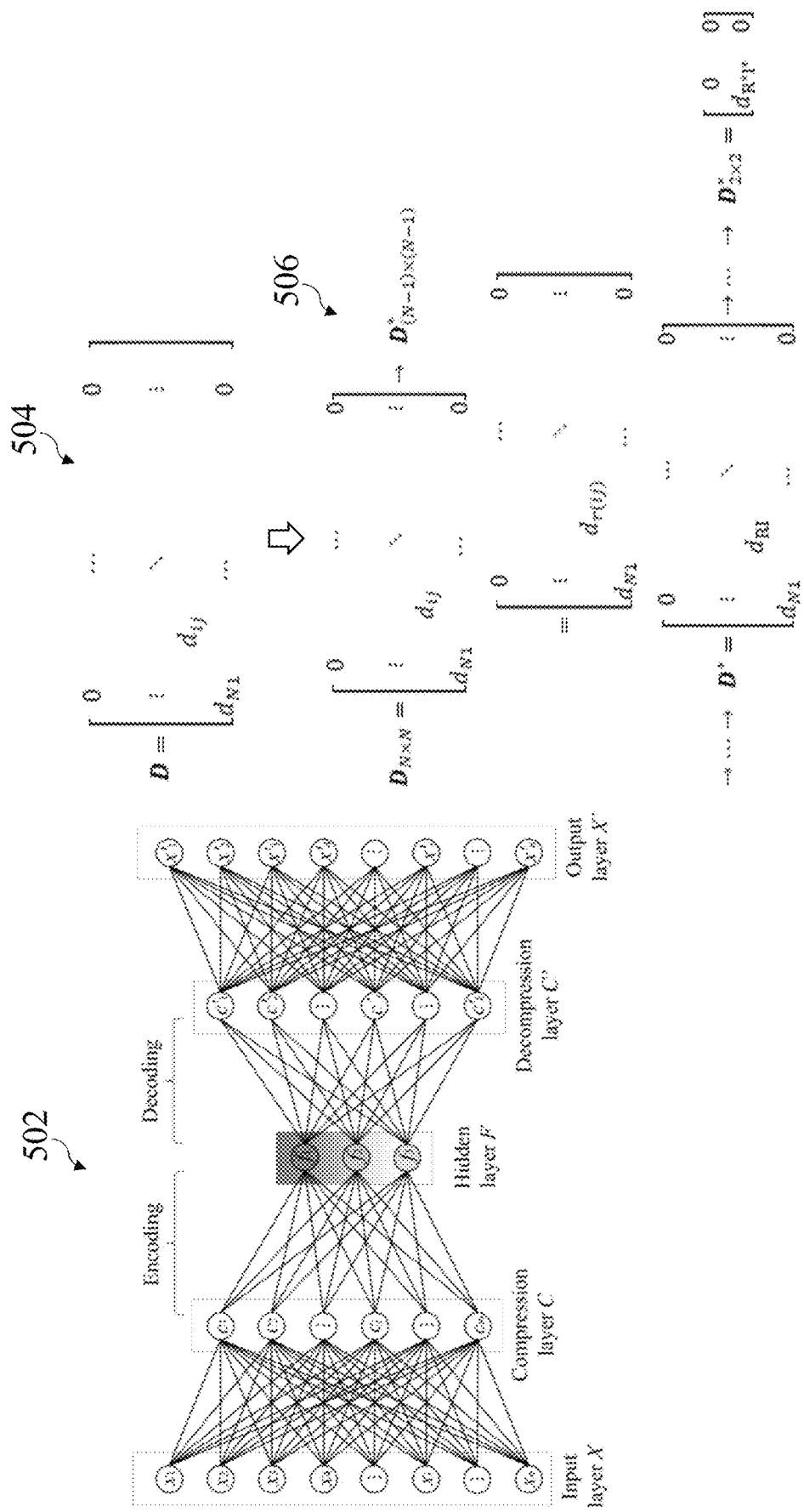
FIG. 22 depicts a schematic diagram illustrating an integrated theory-and-data-driven approach in accordance with one embodiment of the present invention.

In step S306, an integrated theory-and-data-driven approach is performed, as shown in FIG. 22, which illustrates an exemplary diagram of the integrated theory-and-data-driven approach in accordance with one embodiment of the present invention. The integrated theory-and-data-driven approach is performed by applying principal component analysis (PCA) with a neural network 502 and grouping users in hierarchical clustering.

Specifically, the first stage is to perform the dimensionality reduction for a large-scale profile of the database by applying PCA with an unsupervised autoencoder neural network 502, which includes an encoding and a decoding process. The user's large-scale profile, including performance on multiple cognition, literacy, music, creativity, and social-emotion assessments, is transformed into a smaller set of principal components in the compression layer by multiplying the input matrix with the principal component matrix. The principal components are decompressed by dividing by the principal component matrix.

During the encoding process, the input layer is mapped into the hidden layer F with function $E_\Phi$. The input layer comprises a set of normalized feature value x with a set size of n.

For any $x \in X$, $f \in F$, $f = E_\Phi(x) = \sigma(Wx + b)$, where:
$\sigma$ is an element-wise activation function:

$$\sigma(x) = \frac{1}{1 + e^{-x}};$$

W is a matrix of weight;
b is a matrix of bias.

During the decoding process, the output layer X' is reconstructed based on the coder with function $D_\theta$.

For any $f \in F$, $x' \in X'$, $x' = D_\theta(f) = \sigma'(W'f + b')$, where:
$\sigma$ is an element-wise activation function:

$$\sigma'(x) = \frac{1}{1 + e^{-x}};$$

W' is a matrix of weight; and
b' is a matrix of bias.

Then, the difference d(x, x') between X and X' is measured and the loss function $L(\Phi, \theta)$ is obtained.

For $x \in X$, $x' \in X'$, $d(x, x') = \|x - x'\|_2^2$;

$$L(\Phi, \theta) = \frac{1}{N} \sum_{i=1}^{N} \|x_i - D_\theta(E_\Phi(x_i))\|_2^2.$$

The training is complemented by obtaining the optimal $\Phi$ and $\theta$ that minimizes L. After the training, for each user i, a data set of each user is encoded by the encoder, such that a three-dimensional vector is obtained, $f_i = (f_{i1}, f_{i2}, f_{i3})$, theoretically covering C, L, and S scores.

The second stage is to generate original distance matrix D, labeled 504 in FIG. 22, by grouping the users in hierarchical clustering.

Based on the autoencoder results, an N×N distance matrix D 504 is obtained, representing the Euclidean distance between each of two users comprising C, L, and S dimensions/domains. For every two users (e.g., i and j), the sum of the Euclidean distance considering C, L, and S aspects is:

$$d_{ij} = \sqrt{(z_{i1} - z_{i2})^2 + (z_{i2} - z_{i2})^2 + (z_{i3} - z_{i3})^2} = \sqrt{\sum_{k=1}^{3} (z_{ik} - z_{jk})^2}$$

The matrix D 504 can be optimized as the process 506 to obtain a distance matrix D*.

This stage involves grouping the users in the hierarchical clustering based on the users' similarity or distance computed among all users. Specifically, first, the minimum value (e.g., $d_{ij}$) within the matrix D 504 is searched, and the two users (e.g., i and j) are clustered into one group. Then, the distance matrix D* is updated by recalculating the distances among users/merged groups. The searching and merging processes are repeated and clustering is terminated when only two clusters exist, as shown at the end of the process 506.

For the distance $d_{r(ij)}$ between user r and the merged group (ij), $$d_{r(ij)} = \frac{\sqrt{\sum_{k=1}^{3}(z_{rk} - z_{ik})^2} + \sqrt{\sum_{k=1}^{3}(z_{rk} - z_{jk})^2}}{1 \times 2}.$$

For the distance $d_{RI}$ between two merged groups (e.g., group R containing $n_1$ users; group I containing $n_2$ users), $$\text{For } r \in R, i \in I, d_{RI} = \frac{1}{n_1 \times n_2} \sum_{r=1, i=1}^{r=n_1, i=n_2} \sqrt{\sum_{k=1}^{3}(z_{rk} - z_{ik})^2}.$$

Referring back to FIG. 20, in step 308, the theory-driven approach is compared with the integrated theory-and-data-driven approach to check if outcomes of the former align with outcomes of the latter, which serves as a validation mechanism, e.g., to see if the subgroups classified using two approaches are identical. Then, scores of the language and literacy, cognition, creativity, music, and social-emotion domains with respect to the users clustered in the different subgroups are computed.

In step 310, as new users interface with the I-DID system, they are entered into the database, and the screening module 106 automatically and continually updates the subgroups, which serves as validation for the clustering. The updating ensures that the subgroups remain relevant and accurate over time, and allows for the identification of new patterns and trends in users' performance. As a result, the trained I-DID system can dynamically provide a custom intervention to each user as a result of the machine learning.

Referring back to FIG. 2, in step 210, individualized intervention is provided for each subgroup, such that the users 10 in the different subgroups receive different intervention programs via the display 102 or 2100, in which the intervention programs are implemented with music- and simulated narrative-training for reading, writing, listening, speaking, or combinations thereof. In one embodiment, the I-DID system automatically suggests an intervention scheme and recommends that users with suspected dyslexia receive an appropriate intervention program, such as the I-DID game intervention and music intervention. For example, the users 10 in the different subgroups may receive training in the same domain but at different levels.

The I-DID intervention game is called I-DID Carnival, which is an in-house developed mobile app intervention program. This intervention uses interactive game design techniques to accommodate the individual learning needs of various aged children with dyslexia by engaging them in a series of mini-games within a mobile application. These games are designed to enhance children's cognitive, language, and literacy skills that are related to reading difficulties manifested by dyslexia. Although there are existing mobile applications for children and adults with dyslexia, most focus solely on literacy skills. The I-DID Carnival of the present invention is the first to target a variety of cognitive skills, such as working memory, combined visual-motor and auditory skills, and music skills. This bottom-up design enables children with dyslexia to explore their untapped potential.

Figure 23:
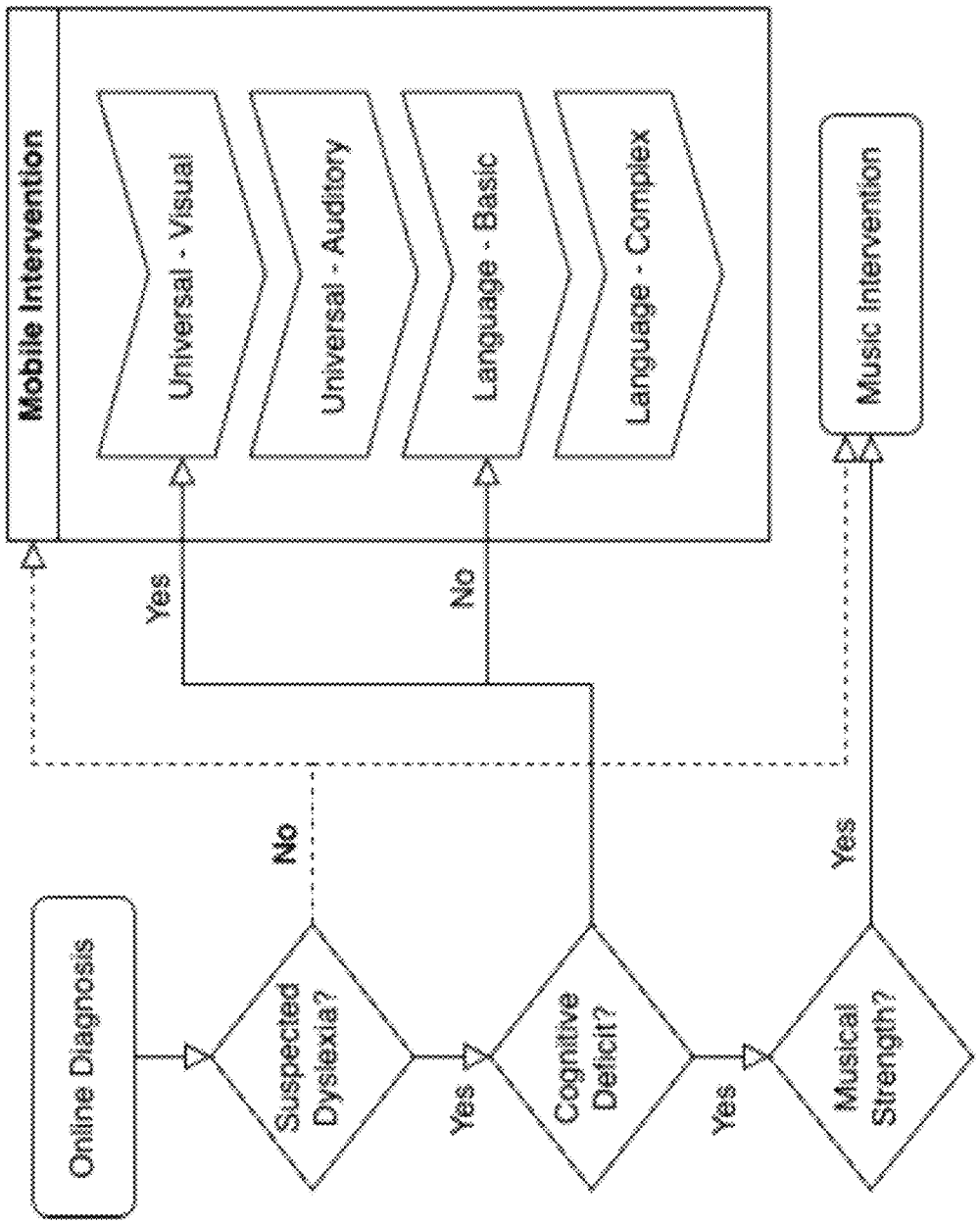
FIG. 23 depicts a process flow diagram illustrating an automatic recommendation for effective dyslexia intervention in accordance with the embodiment of the present invention.
Figure 24:
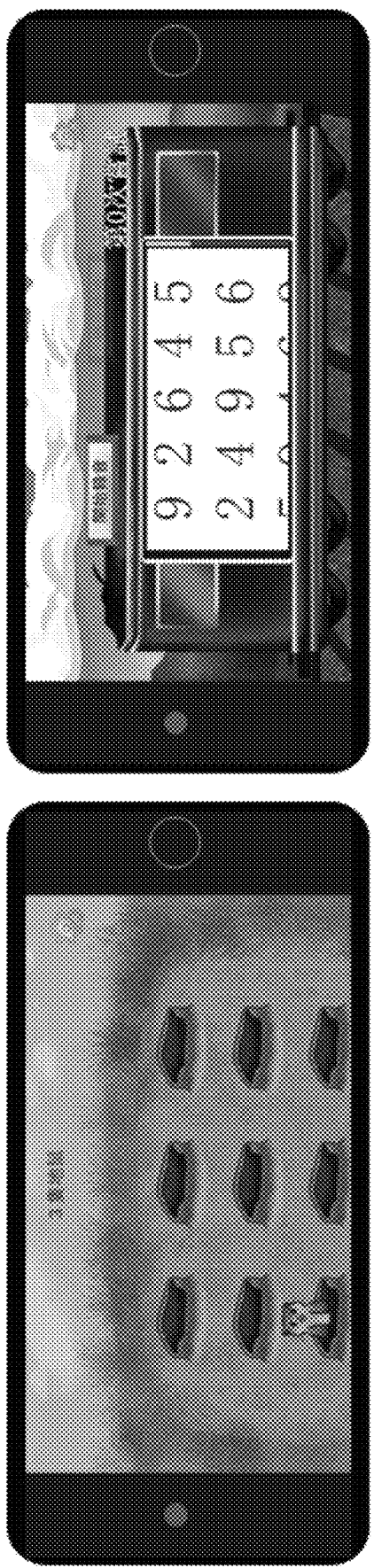
FIGS. 24-28 show the exemplary interfaces of an I-DID game in accordance with some embodiments of the present invention.
Figure 25:
Figure 26:
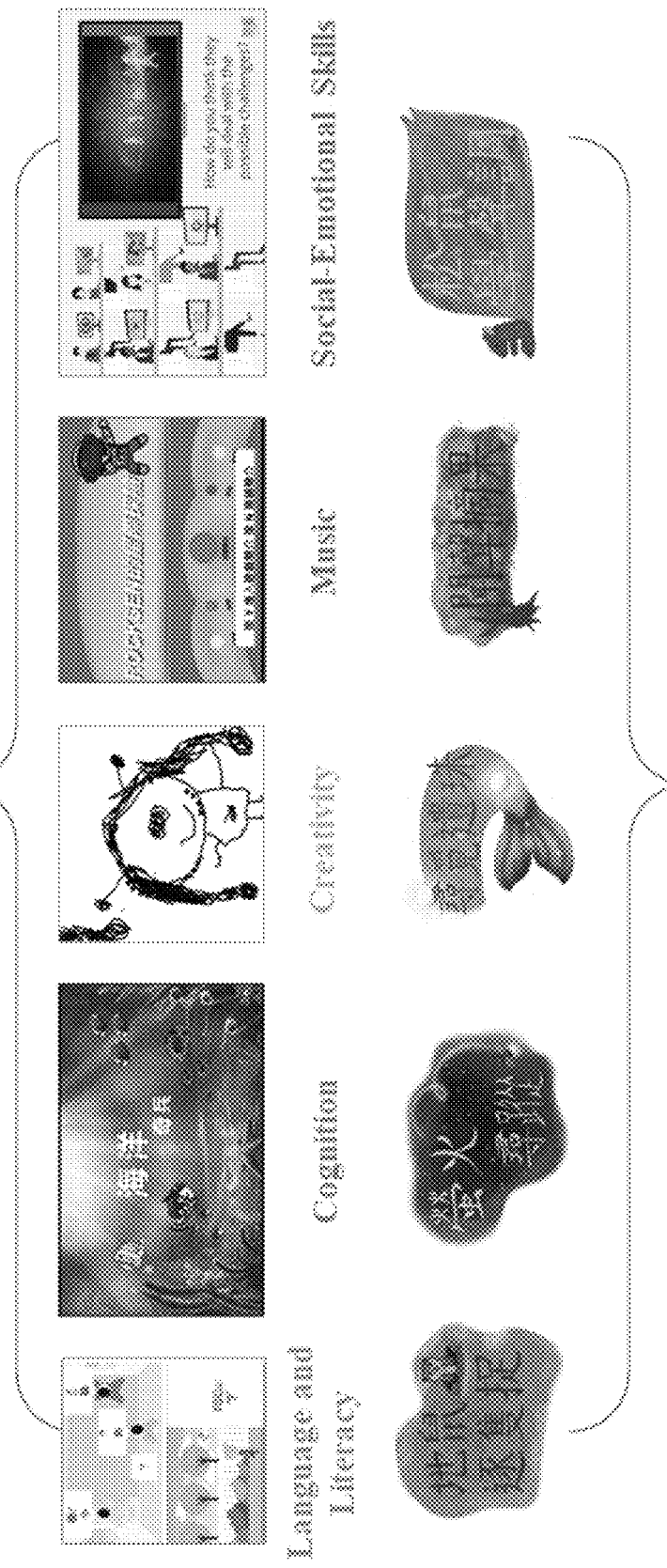
Figure 27:
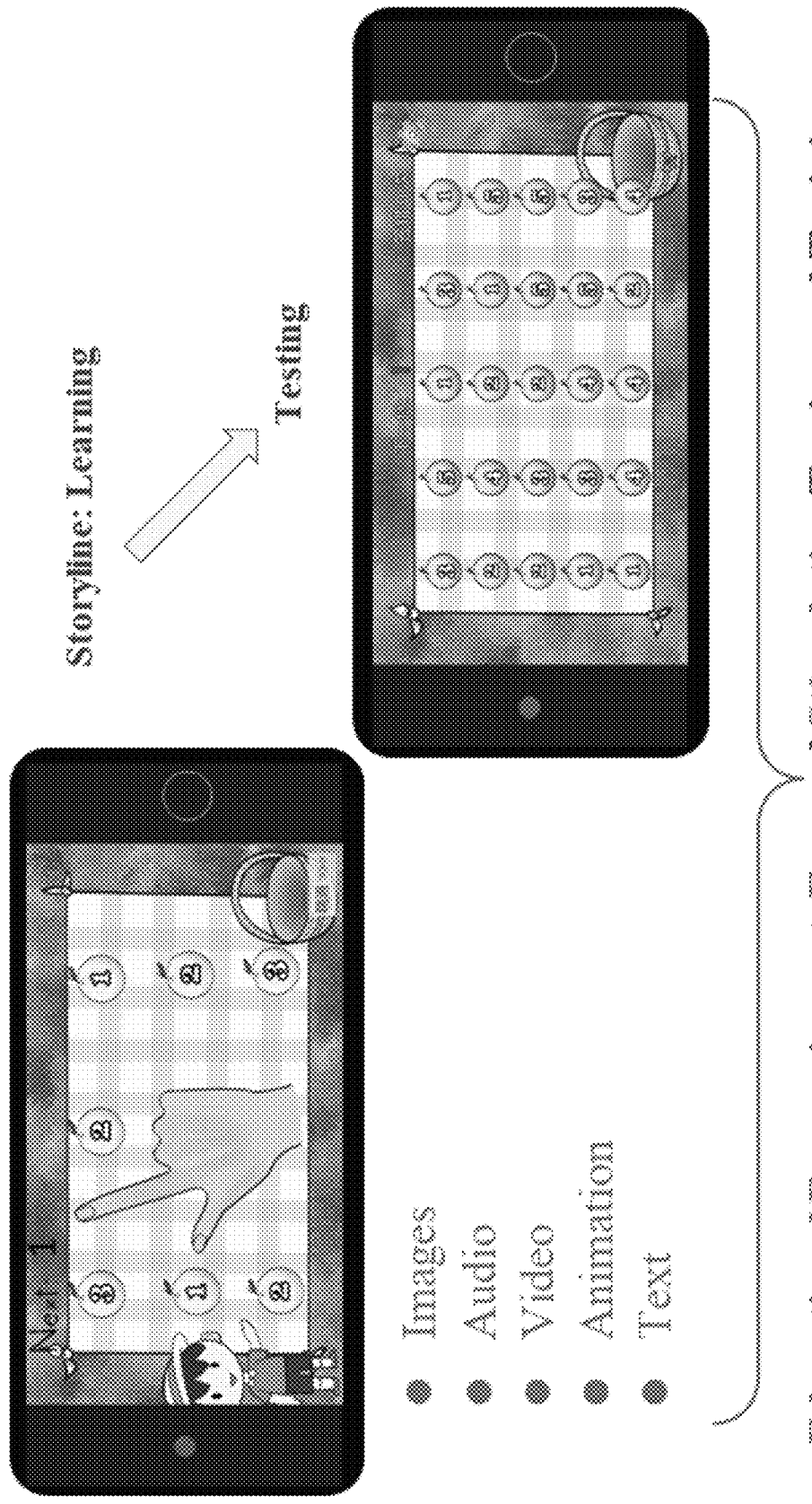
Figure 28:
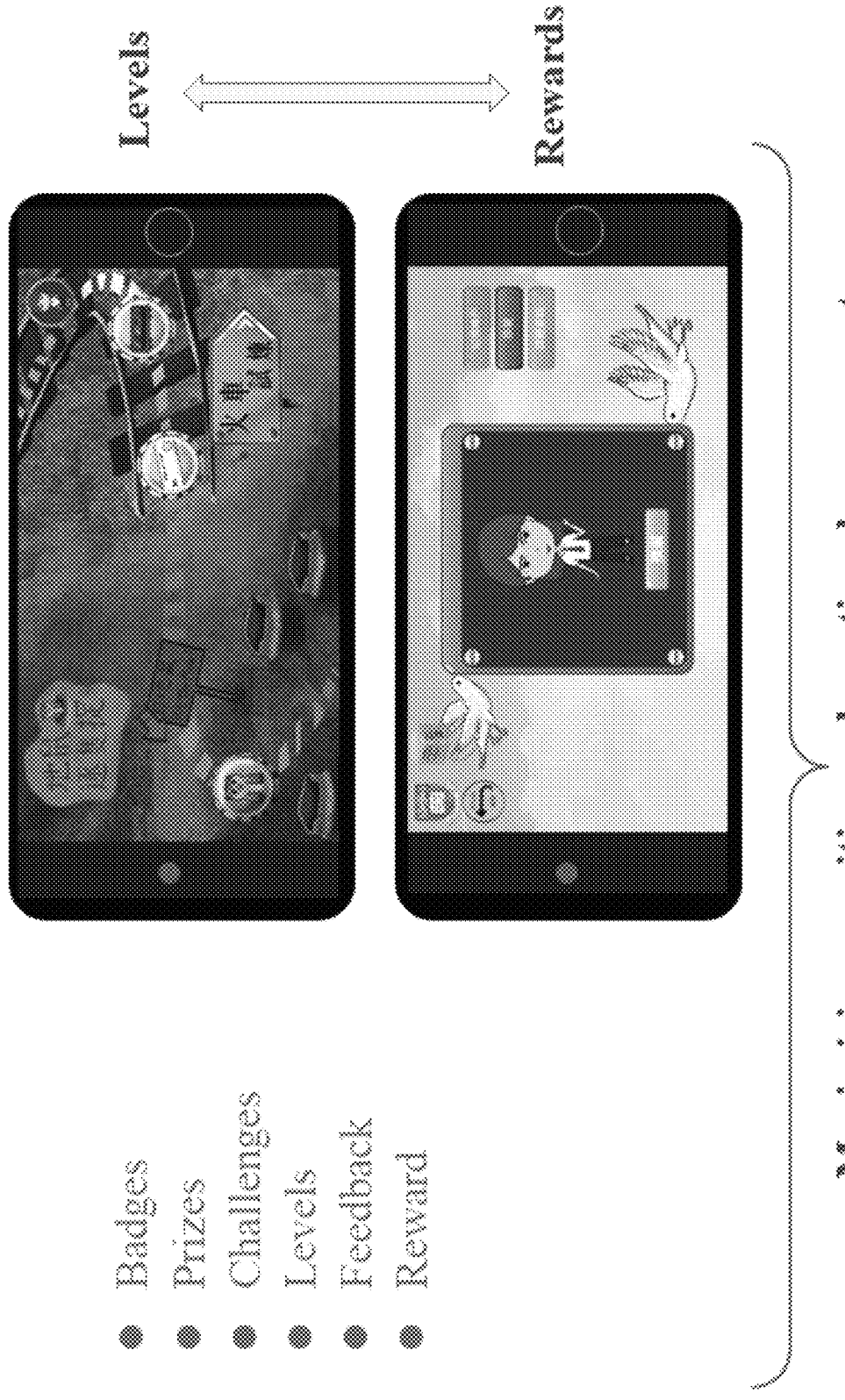

The entire mobile intervention is divided into four components, each targeting a different skill set: (1) Universal-Visual; (2) Universal-Auditory; (3) Language-Basic; and (4) Language-Complex, as shown in FIG. 23 which illustrates an exemplary automatic recommendation for effective dyslexia intervention in accordance with an embodiment of the present invention. The universal layer includes the basic compositions of languages, including both oral and written forms. Written language is highly correlated to visual perception in learning and the motor skills required to write letters and characters. Oral language is constructed utilizing basic auditory sensory skills, such as pitch and rhythm, which are further combined with language-specific units, e.g., phonemes, to form vocabularies and sentences. In addition, visual and auditory working memory are also trained as basic cognitive skills.

Both perception and production of languages involve basic sensory skills. Auditory skills are essential for speech perception and oral language production, while visual-motor skills are necessary for spelling and word dictation. The orthography-phonology connection is the interface between the oral and written forms of language. Morphology serves as the representation of semantic meaning in language systems. These components are all included in the intervention program of the present invention.

The output layers target the perception and production of oral and written languages, specifically, listening, speaking, reading, and writing skills, which are the most fundamental language and literacy skills involved in children's academic development.

FIGS. 24-28 illustrate the I-DID intervention games in accordance with various embodiments of the present invention. All mini-games within the mobile applications have been designed with an attractive and child-friendly themed interface. The visual-motor mini-games ask users to search for patterns (e.g., flying directional patterns of fireflies) or find the matching object pairs, while the working memory games require users to memorize sequences. Furthermore, the mini-game design of the present invention considers the various developmental levels of children by using an incremental design principle to set ten different levels of difficulty. To engage children in game-based training, each game comprises 10 levels of difficulty, which are designed and manipulated according to the target training skills and the format of the game. For example, for the firefly direction game, users are asked to detect the primary flying direction of the majority of fireflies, with levels 1 to 5 including only left or right directions, while levels 6 to 10 consist of four directions (left, right, top, and bottom). Moreover, the time limits for responses decrease incrementally, beginning with 3000 ms at level 1 and finishing with 500 ms at level 10. Similarly, for the auditory pitch discrimination game, the difficulty level is manipulated by increasing the differences of two sounds in terms of cents ($1/100$ of a semitone), which represents the ratio difference between two musical notes calculated by using the formula $1200 \times \log_2 (f_2/f_1)$.

Thus, the incremental framework of the present invention enables a comprehensive yet targeted approach for improving children's reading-related sensory and cognitive skills (e.g., visual-motor skills and working memory) and language skills. In sum, using a systematic bottom-up design, the I-DID carnival of the present invention not only helps children with dyslexia remediate their specific language- and reading-related difficulties, but also enhances typically developing peers' language and literacy-related skills.

Another I-DID intervention program is music-based language intervention for children with and without dyslexia. This intervention is designed to enhance children's pitch perception in both linguistic and non-linguistic contexts. Specifically, a series of structured and incremental games incorporating gamified, multi-sensory practices bridges the learning concepts of musical pitches, lexical tones, and speech rhythms for children. This intervention is based on evidence showing that efficacy of music training improves a range of reading-related constructs, such as phonological skills and spelling, among primary school students with dyslexia (Willats, 1994, Reifinger, 2019). Moreover, numerous previous studies show that musicians exhibit superior abilities than non-musicians in processing pitch and tonal information related to speech signals (e.g., Besson et al., 2011, Cooper & Wang, 2012).

In addition, the rationale for targeting lexical tone for intervention comes from a study showing that, compared to their TD peers, Hong Kong Chinese children with dyslexia exhibited significant weaknesses in lexical tone perception (Tong, Tong, & Yiu, 2017). The music-based lexical tone intervention of the present invention is one of the first to translate such scientific evidence into clinical practice by improving tone learning through musical pitch training in nonlinguistic and linguistic contexts. Training content for both musical pitches and lexical tones follow an incremental approach whereby the level of difficulty gradually increases. This accommodates not only a wide range of children and adults, but also any potential learners who exceed their expected age-related capabilities. Each game-based training is framed by an objective and accompanied by guided multimedia learning activities. Moreover, various pre- and post-intervention mini-games are embedded in each training session to precisely assess the training outcomes for each individual user. This feature allows the user to automatically adjust the difficulty level based on each user's performance, enabling more individualized intervention. Such music-based language intervention (via gamification and animated virtual reality) not only enhances potential musical strengths of children with dyslexia, but also stimulates children's interests in language learning, thus mitigating their learning difficulties.

In summary, as a teaching aid, the newly developed interface for the clinical diagnosis and intervention of dyslexia embraces the following features.

First, the I-DID system digitalizes all assessment and intervention tests using various gamification and multimedia techniques for the screening and treatment of Chinese, English, and Chinese-English bilingual children with and without dyslexia.

The I-DID system represents a synergy of machine learning based on extensive and dynamic training with rigorous diagnostic assessment and treatment designs. Specifically, by utilizing advanced graphic designs, animation techniques, game mechanics, and multimedia displays, the I-DID system creates a fun and stimulating virtual testing and learning environment. All assessment games blend images, audio, video, animation, and text. The intervention system is a multi-game learning platform comprising 10 levels with immediate feedback and reward systems. Such digitization and gamification not only transform traditional exam or test-based assessment by maximizing learners' engagement and motivation, but also increases the efficiency and accessibility of early screening and treatment for all children at risk for dyslexia.

Second, for the self-developed content and design innovation, the I-DID system revamps deficit-based, monolingual, child-only assessment by creating an integrated strength-weakness assessment and intervention in Chinese and English for children and parents. The assessment can be used for either Chinese or English users, or Chinese-English bilingual users who live in a multilingual society.

The I-DID system is the first computer interface to assess (1) strengths in creativity, music, cognition, and social-emotional skills, and weaknesses in language and literacy, of children with dyslexia; (2) L1 Chinese and L2 English; and (3) children and parents. More importantly, the I-DID system comprises more than 90 (92 in one embodiment of the present invention) self-developed and in-house programmed games assessing five domains, i.e., language and literacy, cognition, creativity, music, and social-emotional skills, promoting a holistic view of individual development.

Third, regarding user experience innovation, the I-DID system accommodates the diverse needs of neurodiverse and neurotypical learners through progressive web application.

The I-DID system capitalizes on a user-oriented design and accommodates the diverse and individualized needs of learners of different ages through a choice of website and app modalities. As young children may not be mobile phone users, the I-DID website supports a touch screen-enabled assessment system that young children can easily access. Meanwhile, the mobile application is convenient for adults and easy to navigate even for beginner mobile phone users. Additionally, all games operate on the notion of sustainable assessment, in which designed activities not only serve an immediate diagnostic purpose, but are programmed to enable learners to self-monitor and undertake assessment at any time to track their continued progress and enhancement.

Moreover, the following novel aspects of the present invention are further elaborated.

1. An Intelligent Online Diagnosis and Intervention System

The I-DID intelligent computer system is designed to provide a timely diagnosis and early intervention for children at risk of developmental dyslexia. The user-friendly interface and low cost associated with operating the I-DID system places the current system ahead of, and will eventually replace, traditional and more costly in-person service models and processes for diagnosing Chinese and Chinese-English bilingual children with dyslexia. It can further be applied to other bilingual populations, such as Spanish-English, Korean-English, Arabic-English, Japanese-English, and Farsi-English bilingual children.

2. Scope of Application

The I-DID system can be applied to widespread use on three levels, including individual, group and classroom. First, the aforementioned clinical practice aspect is especially direct since I-DID is tailored for Chinese children (and other bilingual language learners) and adults and children learning English as a second/foreign language, and can provide a comprehensive profile of the various abilities of this population. Second, the I-DID system can be implemented in local mainstream primary schools by teachers for efficient assessment at the classroom level. Ultimately, this system can be applied to other non-local Chinese mainstream schools in other societies, such as Singapore, Taiwan, and Mainland China. In the US the system can be modified to meet the needs of the large number of bilingual Spanish-English children, along with the various other bilingual populations listed above. Third, regardless of where they are in the world, parents who are raising Chinese-English speaking children may also utilize this system to gain a more comprehensive understanding of their children's strengths and weaknesses.

3. Strengths-Weaknesses-Based Design

The integrated strengths-weaknesses diagnostic-intervention approach that governs the design of the I-DID system enables parents to identify the strengths and weaknesses of their child and prioritize targeted literacy practices at home. More importantly, the personalized, computerized, and gamified features of the multi-faceted I-DID system can be easily implemented by parents or caregivers. Finally, the strengths-weaknesses diagnostic-intervention I-DID products can be transformed and modified for use in other non-Chinese speaking societies, thus relieving clinical and educational professionals from the more mundane aspects of their profession and enabling them to focus more on self-enhancement and personal care.

4. Promotion of Well-Being

The I-DID system's goal is to empower children at risk for dyslexia by identifying their underutilized assets and untapped potential while ameliorating their reading difficulties. Ultimately, the I-DID system supports all children's ability to learn, thrive, and develop resilience for future challenges.

In addition to its unique features, the implementation of the I-DID system will address the following long-felt needs in the market.

First, the I-DID system offers a comprehensive battery of English and Chinese assessments tailor-made to serve the bilingual characteristics of the Hong Kong population. At present, no digitalized, standardized assessment tool is available to provide diagnosis of developmental dyslexia in both English and Chinese. In addition, with its web- and mobile app-based online implementation, the I-DID system can automatically provide individual and group users a comprehensive strength and weakness profile across language and literacy, cognition, creativity, music, and social-emotional domains.

Furthermore, as it provides timely identification of dyslexic symptoms and personalized training for children at risk for dyslexia, the I-DID system can alleviate the often delayed treatment that follows long waiting times for clinical assessment and follow-up services that commonly persist in different societies. Its online feature enables the assessment and intervention services to be accessible to all families anytime and anywhere, which is particularly necessary for families who struggle to obtain costly in-person diagnostic and treatment services.

More importantly, the digitalized clinical assessment and intervention systems are designed for individuals of different age groups, from preschoolers to adults. Considering that most formal diagnoses of dyslexia are commonly performed in children aged 7 to 8 years old (primary school years), the I-DID system can precisely identify behavioral symptoms and developmental trends prior to this age, e.g., preschool children, which can help facilitate an earlier diagnosis.

A brief justification of the present invention over existing approaches are provided as follows.

(1) Unlike all existing reading assessment and remediation programs, which are deficit-rather than strength-based and which may cause children, parents, and teachers to emphasize the deficiencies of children with dyslexia while neglecting their underutilized assets and untapped potential, the I-DID system of the present invention capitalizes on the individual strengths of children and adults with dyslexia while improving specific component reading skills.

(2) Unlike most existing assessments and interventions for dyslexia, which rely on an in-person, face-to-face delivery model, the on-line I-DID system of the present invention makes the process of early diagnosis and intervention easier, faster, and more precise by minimizing the constraints of time and physical location. More importantly, the I-DID system of the present invention is an intelligent system that can recognize and integrate all layers of assessment information and generate a comprehensive strength-weakness profile of the at-risk child and adult.

(3) Unlike most existing assessment and intervention programs, which employ a "one-size-fits-all" approach that neglects the heterogeneity of individuals with DD, the I-DID system of the present invention characterizes a strength-weakness profile of each user and provides an individualized intervention program that accommodates the diverse learning needs of children with and without DD.

(4) Unlike most existing assessment and intervention programs, which focus on only at-risk children and their first language, the I-DID system of the present invention synergizes diagnoses in both children and their parents in their first language (Chinese) and second language (English).

(5) Unlike most existing assessment and intervention programs, which focus on a limited set of cognitive and literacy skills, the I-DID system of the present invention systematically incorporates language and literacy, cognition, creativity, music, and social-emotional skills into its diagnosis and intervention system. This can empower at-risk children through positive diagnostic experiences and training outcomes, which can then mitigate their potential emotional, behavioral, and reading problems.

The functional units and modules, including the aforedescribed electronic clinical diagnosis and intervention system, and/or methods in accordance with the embodiments disclosed herein can be implemented using computer processors or electronic circuitries including but not limited to application specific integrated circuits (ASIC), field programmable gate arrays (FPGA), microcontrollers, and other programmable logic electronic circuitries configured or programmed according to the present disclosure. Machine instructions or software codes running in the electronic clinical diagnosis tools can readily be prepared by practitioners skilled in the software or electronics art based on the of the present disclosure.

All or portions of the methods and systems in accordance with the embodiments can be executed in one or more computing devices, including server computers, personal computers, laptop computers, and mobile computing devices, such as smartphones and tablet computers.

The embodiments may include computer storage media, transient and non-transient memory having computer instructions or software codes stored therein, which can be used to program or configure the electronic teaching devices to perform any of the processes of the present invention. The storage media and transient and non-transient memory can include, but are not limited to, floppy disks, optical discs, Blu-ray Disc, DVD, CD-ROMs, and magneto-optical disks, ROMs, RAMs, flash memory, or any type of media suitable for storing instructions, codes, and/or data.

Each of the functional units and modules in accordance with various embodiments can also be implemented in distributed computing environments and/or Cloud computing environments, wherein the whole or portions of the machine instructions are executed in distributed fashion by one or more computing devices interconnected by a communication network, such as an intranet, Wide Area Network (WAN), Local Area Network (LAN), the Internet, and other forms of data transmission media.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A system for strengths-weaknesses based clinical assessment and intervention for dyslexia comprising:
   a database comprising a large-scale profile of a plurality of user performance sets across different domains;
   a first subgroup generator for performing a theory-driven machine learning approach with respect to the database by obtaining a layer with nodes which are computed by summing all component values multiplied by factor loadings of component values using exploratory factor analysis, wherein subgroups are generated according to whether the nodes are activated;
   a second subgroup generator for performing an integrated theory-and-data-driven machine learning approach with respect to the database by training a neural network applying a principal component analysis (PCA) via an encoder and a decoder, wherein a data set of each user is encoded to a three-dimensional vector by the encoder and clustering the users in a hierarchical clustering to group users based on the users' similarity or distance computed among the users;

a comparator comparing the theory-driven machine learning approach with the integrated theory-and-data-driven machine learning approach to determine whether the theory-driven machine learning approach aligns with the integrated theory-and-data-driven machine learning approach; and a scoring module computing scores of the various domains with respect to users clustered in the different subgroups;

an intervention module to provide individualized intervention for each of the subgroups, such that the users in the different subgroups receive different interventions;

wherein the interventions comprise training in one or more domain-general cognitive and music skills, or language-specific listening, speaking, reading, writing, or combinations thereof.

2. The system of claim 1, wherein the second subgroup generator clusters users in the hierarchical clustering more than once and is terminated until only two clusters exist.

3. The system of claim 1, further comprising an updating unit to dynamically update the subgroups as new users enter the database.

4. The system of claim 1, wherein the intervention includes visual-motor games.

5. The system of claim 4 in which the visual-motor games direct users to perform one or more of searching for patterns, matching object pairs, or memorizing sequences.

6. The system of claim 1, wherein the intervention includes detection and distinguishing subtlety of differences between speech and non-speech sounds.

7. The system of claim 1, wherein the intervention includes progressively increasing levels of difficulty.

8. The system of claim 1, wherein the intervention includes vocabulary games.

9. The system of claim 8, wherein the vocabulary games include vocabulary breadth and depth.

10. The system of claim 1, wherein the intervention includes music assessment games which assess music emotions and instrumental preference while incorporating basic musical elements.

11. The system of claim 1, wherein the user performance sets include data from dyslexic bilingual users.

12. The system of claim 11, wherein the dyslexic bilingual users are Chinese-English language dyslexic bilingual users.

13. A clinical assessment and intervention device, comprising:
   the system of claim 1;
   a user interface;
   a display;
   a processor.

14. A mobile device selected from one or more of a mobile phone, a tablet, or a laptop including the clinical assessment and intervention device of claim 13.

* * * * *